(12) United States Patent
Yasuda

(10) Patent No.: US 7,542,222 B2
(45) Date of Patent: Jun. 2, 2009

(54) LENS BARREL DRIVE APPARATUS

(75) Inventor: Hiromu Yasuda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 97 days.

(21) Appl. No.: 11/741,075

(22) Filed: Apr. 27, 2007

(65) Prior Publication Data

US 2007/0253075 A1 Nov. 1, 2007

(30) Foreign Application Priority Data

Apr. 27, 2006 (JP) ............................. 2006-123660

(51) Int. Cl.
*G02B 7/02* (2006.01)
*G02B 15/14* (2006.01)

(52) U.S. Cl. ..................... 359/827; 359/676; 359/819; 359/829

(58) Field of Classification Search ................. 359/819, 359/829, 676, 827

See application file for complete search history.

(56) References Cited

U.S. PATENT DOCUMENTS 4,605,286 A 8/1986 Sumi 5,499,143 A * 3/1996 Sakamoto et al. ........... 359/824

FOREIGN PATENT DOCUMENTS

| JP | 2-71155 U | 5/1990 |
| JP | 2002-051524 A | 2/2002 |
| JP | 2004-347890 A | 12/2004 |
| JP | 2005-202316 A | 7/2005 |

* cited by examiner

*Primary Examiner*—Jordan M. Schwartz
*Assistant Examiner*—James C Jones
(74) *Attorney, Agent, or Firm*—Rossi, Kimms & McDowell LLP

(57) ABSTRACT

A lens barrel drive apparatus which can be reduced in outside diameter to realize reduced diameter. A guide bar guides a lens along an optical axis. Hollow magnets are disposed on an outer peripheral side of the lens and have magnetized portions alternately magnetized to different poles in the circumferential direction. A cylindrical rotor is disposed rotatably with respect to the magnets, made of a soft magnetic material, and is comprised of magnetic pole portions opposed to the magnetized portions of the magnets. A coil energizes the magnetic pole portions of the rotor. A stator fixes the magnets and the coil. A conversion unit adapted to convert rotating movements of the rotor into forward and backward movements of the lens along the optical axis. The magnets have breaks formed along the optical axis, and the guide bar is disposed in the break of the magnets.

3 Claims, 20 Drawing Sheets

LENS BARREL DRIVE APPARATUS

BACKGROUND OF THE INVENTION

1. Field of the Invention

The present invention relates to a lens barrel drive apparatus which causes a lens barrel holding an optical component for an image pickup apparatus to move along an optical axis at the time of focusing or zooming.

2. Description of the Related Art

Conventionally, there has been proposed a lens barrel drive apparatus which causes a lens of a still camera, a video camera, or the like to move along the optical axis (see e.g. Japanese Laid-Open Utility Model Publication (Kokai) No. H02-71155). In this conventional lens barrel drive apparatus, a small stepping motor is disposed in parallel with a lens to drive the lens via a lead screw or the like.

The stepping motor used for the lens barrel drive apparatus of this type has a solid cylindrical shape with no opening (in the central part, no through opening is formed but a component part is provided). Thus, in order to prevent interference with an optical path, the stepping motor has to be disposed outside the lens, it is difficult to make the entire lens barrel drive apparatus small in diameter.

In view of the foregoing, there has been proposed a lens barrel drive apparatus which uses a hollow cylindrical motor and uses an opening penetrating through the central part of the motor as the optical axis of the lens so as to make the radial size of the apparatus small (see e.g. Japanese Laid-Open Patent Publication (Kokai) No. 2002-051524 and U.S. Pat. No. 4,605,286). Such an arrangement can reduce the size of the lens barrel drive apparatus. A description will now be given of the conventional lens barrel drive apparatuses with reference to FIGS. 19A and 19B.

FIG. 19A is a front view of the conventional lens barrel drive apparatus as viewed in the direction of the optical axis in the case where the solid motor is used. FIG. 19B is a front view of the conventional lens barrel drive apparatus as viewed in the direction of the optical axis in the case where the hollow motor is used.

In the case where the solid motor M1 is used as shown in FIG. 19A, the diameter of the lens barrel drive apparatus is expressed by the following equation, (the diameter of lens L1)+2×(thickness of lens barrel H1)+2×(diameter of solid motor M1). On the other hand, in the case where the hollow motor M2 is used as shown in FIG. 19B, the diameter of the lens barrel drive apparatus is expressed by the following equation, (the diameter of lens L2)+2×(thickness of lens barrel H2)+2×(thickness the diameter of hollow motor M2). The thickness of the hollow motor is approximately equal to the radius of the solid motor. Thus, using the hollow motor can reduce the size of the lens barrel drive apparatus by the diameter of the solid motor.

There has been conventionally proposed another lens barrel drive apparatus which uses a hollow motor to drive a lens barrel supported by guide bars (see e.g. Japanese Laid-Open Patent Publication (Kokai) Nos. 2004-347890 and 2005-202316). In the lens barrel drive apparatus of this type, the lens barrel can be held with high accuracy, low friction, and low noise since the guide bars support the lens barrel.

However, the above other conventional lens barrel drive apparatus have the problem that, since the hollow motor drives the lens barrel supported by the guide bars, it is difficult to make the lens barrel drive apparatus small in diameter. This will be described with reference to FIGS. 20A and 20B.

FIG. 20A is a front view of the other conventional lens barrel drive apparatus as viewed in the direction of the optical axis in a case where the guide bars are disposed inside the hollow motor, and FIG. 20B is a front view of the other conventional lens barrel drive apparatus as viewed in the direction of the optical axis in a case where the guide bars are disposed in notches of the hollow motor.

As shown in FIG. 20A, since the guide bars B3 are disposed at both ends of a lens L3 which is circular, the hollow motor M3 has to be disposed further outside the guide bars B3. For this reason, there is a dead space between the lens barrel H3 and the hollow motor M3, and it is difficult to make the lens barrel drive apparatus small in size and diameter. To address this problem, notches are formed in the hollow motor M4, and guide bars B4 are disposed in the notches as shown in FIG. 20B. This arrangement can inhibit the formation of a dead space between the lens barrel H4 and the hollow motor M4 and reduce the diameter of the lens barrel drive apparatus.

If the hollow motor of which rotor is a magnet is used as is in case of the above conventional lens barrel drive apparatus, notches for preventing interference with the guide bars and the lens barrel cannot be formed in the rotary magnet. Thus, the thick magnet has to be disposed outside the guide bars, and it is difficult to make the lens barrel drive apparatus small.

Also, in the above other conventional lens barrel drive apparatus, a bearing of the motor is notched so as to reduce the size of the lens barrel drive apparatus. However, since a magnet and a coil are disposed outside the guide bars, there is a limit to the extent to which the lens barrel drive apparatus can be reduced in diameter.

SUMMARY OF THE INVENTION

The present invention provides a lens barrel drive apparatus which can be reduced in outside diameter to realize reduced diameter.

To attain the above object, in an aspect of the present invention, there is provided a lens barrel drive apparatus comprising a guide member adapted to guide an optical component along an optical axis, hollow magnets disposed on an outer peripheral side of the optical component and having magnetized portions alternately magnetized to different poles in a circumferential direction, a cylindrical rotor disposed rotatably with respect to the magnets and formed of a soft magnetic material, the cylindrical rotor having magnetic pole portions opposed to the magnetized portions of the magnets, a coil adapted to magnetize the magnetic pole portions of the rotor, a stator adapted to fix the magnets and the coil, and a conversion unit adapted to convert rotating movements of the rotor into forward and backward movements of the optical component along the optical axis, and the magnets comprise breaks formed along the optical axis, and the guide member is disposed in the break of the magnets.

The rotor can comprise a rotary yoke having the magnetic pole portions, and a rotor having an inner periphery to which the rotary yoke is fixed, and the conversion unit comprises a female thread portion formed at the inner periphery of the rotor, and a male thread portion formed in the guide member and adapted to be engaged with the female thread portion.

The rotor can comprise a rotary yoke having the magnetic pole portions, and a rotor having an inner periphery to which the rotary yoke is fixed, and the conversion unit can comprise a cam groove formed at the inner periphery of the rotor, and a drive pin formed in the guide member and adapted to be engaged with the cam groove.

The rotor can comprise a rotary yoke having the magnetic pole portions, and a rotor having an inner periphery to which the rotary yoke is fixed, and the conversion unit can comprise a female thread portion formed at an inner periphery of a cylindrical member disposed on an outer peripheral side of the rotor, and a male thread portion formed at an outer periphery of the rotor and adapted to be engaged with the female thread portion.

The rotor comprises a rotary yoke having the magnetic pole portions, and a rotor having an inner periphery to which the rotary yoke is fixed, and the conversion unit can comprise a cam groove formed at an inner periphery of a cylindrical member disposed on an outer peripheral side of the rotor, and a drive pin formed at an outer periphery of the rotor and adapted to be engaged with the cam groove.

The rotor can comprise a rotary yoke having the magnetic pole portions, and a rotor having an inner periphery to which the rotary yoke is fixed, and the conversion unit can comprise a drive pin formed at an inner periphery of a cylindrical member disposed on an outer peripheral side of the rotor, and a cam groove formed at an outer periphery of the rotor and adapted to be engaged with the drive pin.

The rotor comprises a cylindrical rotary yoke having the magnetic pole portions, and the conversion unit can comprise a male thread portion formed at an outer periphery of the rotary yoke, and a female thread portion formed in the guide member and adapted to be engaged with the male thread portion.

The rotor can comprise a cylindrical rotary yoke having the magnetic pole portions, and the conversion unit can comprise a cam groove formed at an outer periphery of the rotary yoke, and a drive pin formed in the guide member and adapted to be engaged with the cam groove.

The coil can be wound between the optical component and the guide member in such a manner as to enclose the optical component.

The coil can be wound in such a manner as to enclose the optical component and the guide member The number of the magnets can be at least two, and the breaks are provided in spaces sandwiched between the magnets.

The magnets can be shaped like a character "C" in cross section.

The lens barrel drive apparatus further comprises a lens barrel adapted to hold the optical component, and a rectangular sleeve portion attached to the lens barrel and extending along the optical axis, and the guide member comprises a rod-shaped member to be engaged with the sleeve portion.

According to the present invention, since the guide member is disposed in the break between the magnets, the guide member and the magnets can be arranged in substantially the same diameter. Also, since the rotor having the magnetic pole portions is used, the rotor can be made thinner as compared with the case where a magnet is used as a rotor as in the related art. As a result, the lens barrel drive apparatus can be reduced in outside diameter to realize reduced diameter.

The above and other objects, features, and advantages of the invention will become more apparent from the following detailed description taken in conjunction with the accompanying drawings.

DETAILED DESCRIPTION OF THE PREFERRED EMBODIMENTS

Figure 1:
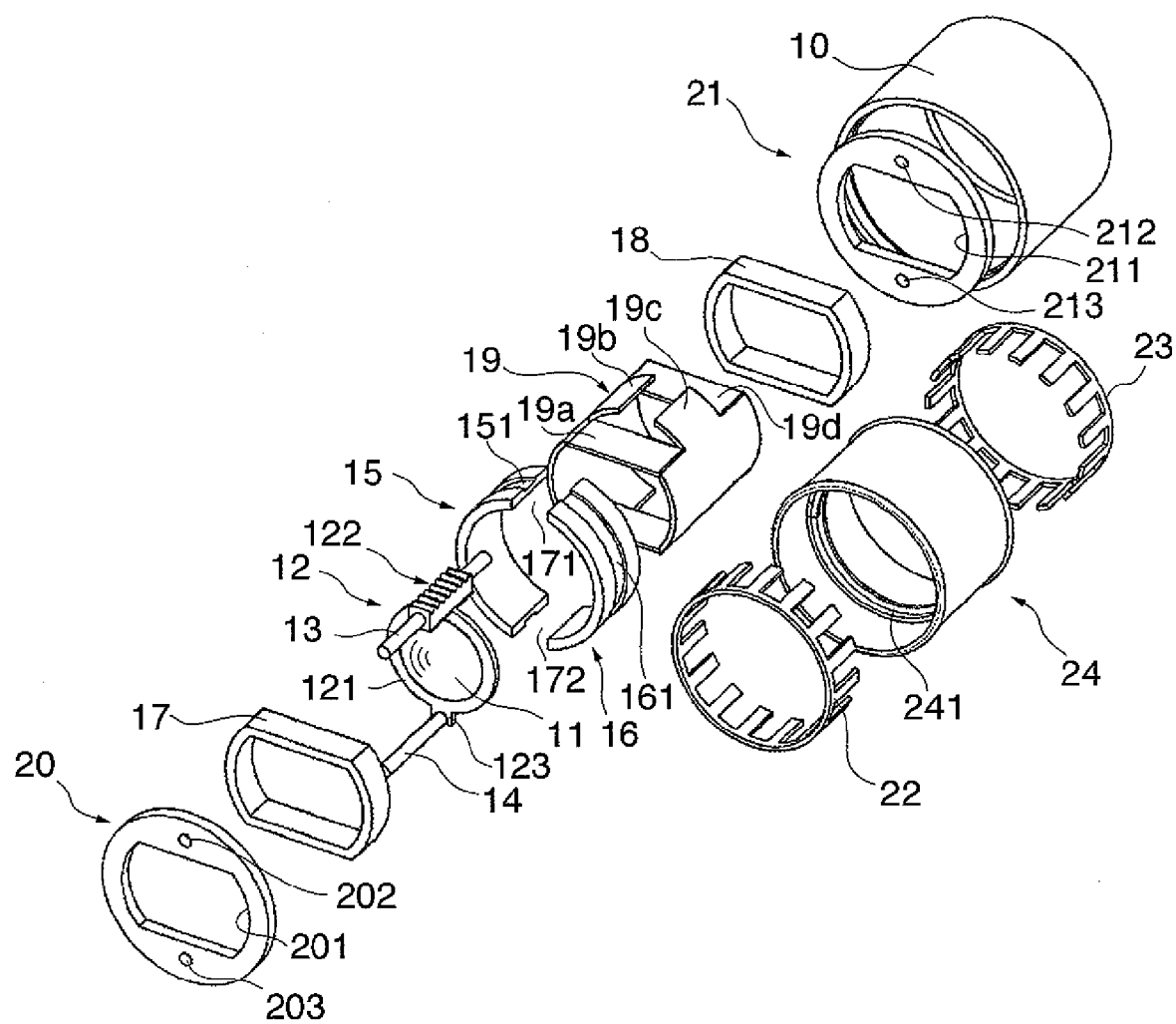
FIG. 1 is an exploded perspective view schematically showing the construction of a lens barrel drive apparatus according to a first embodiment of the present invention.
Figure 2:
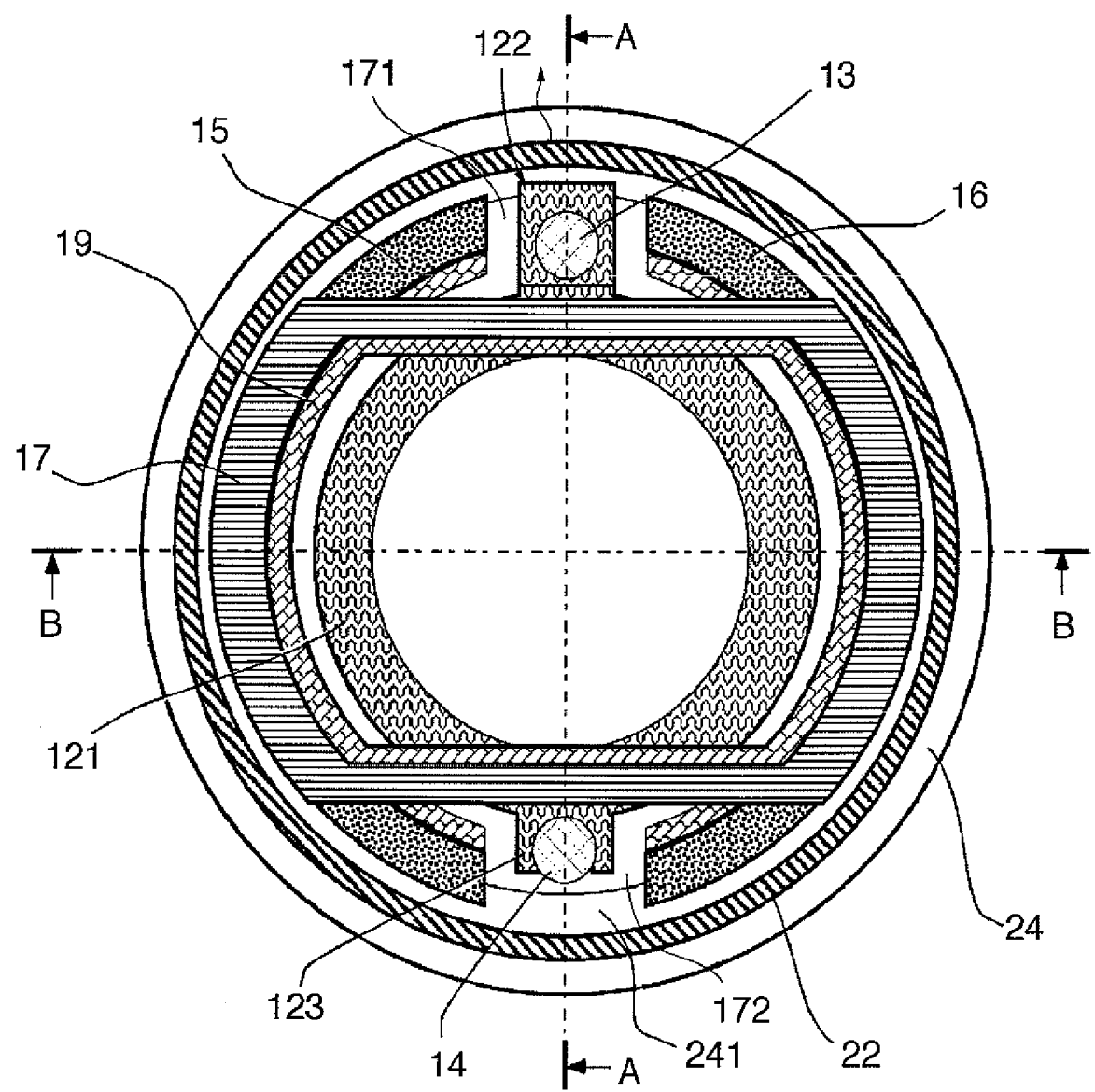
FIG. 2 is a sectional view of the lens barrel drive apparatus in FIG. 2 in a direction perpendicular to an optical axis.
Figure 3:
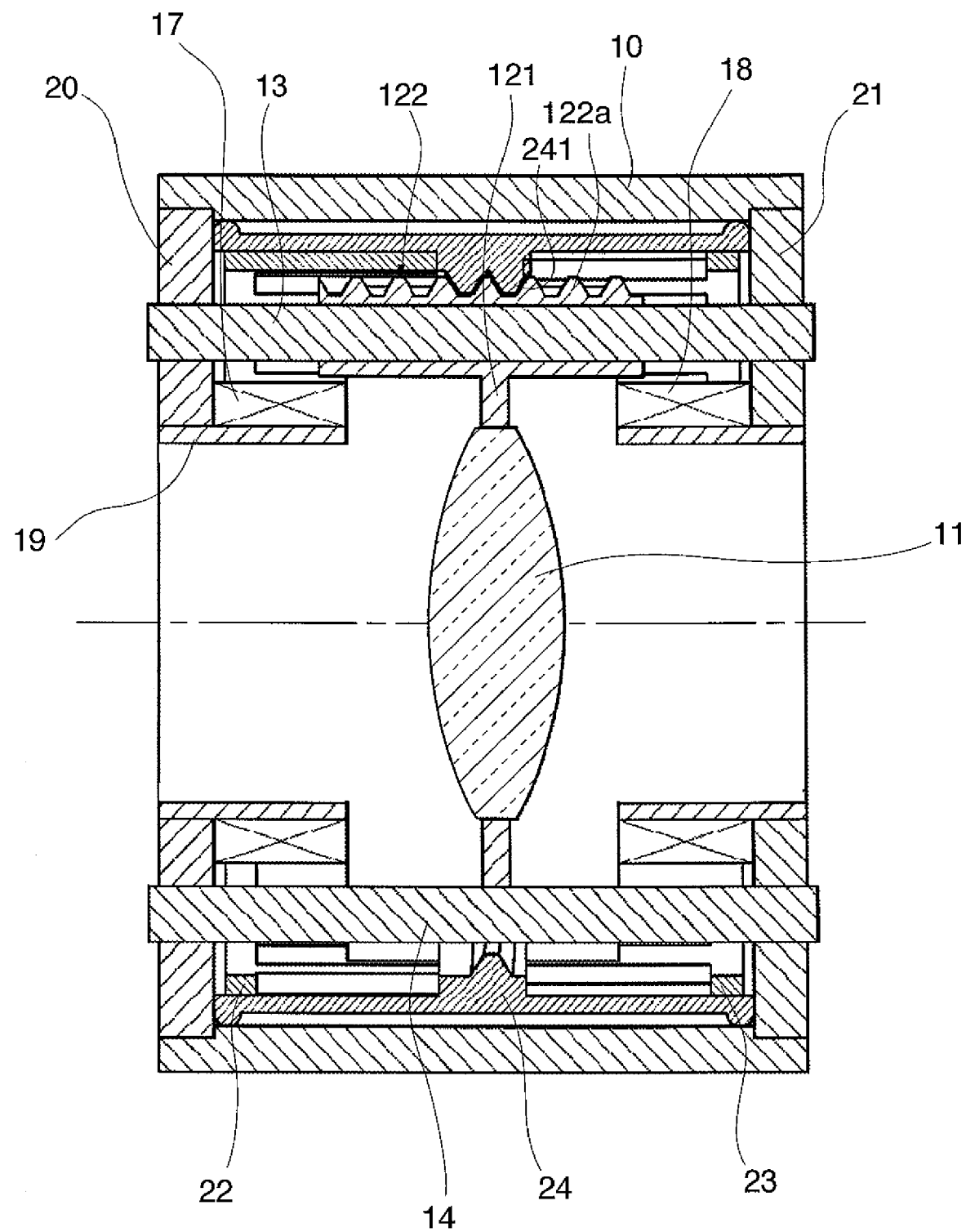
FIG. 3 is a sectional view of the lens barrel drive apparatus taken along an arrow A-A of FIG. 2 and passing through the optical axis.
Figure 4:
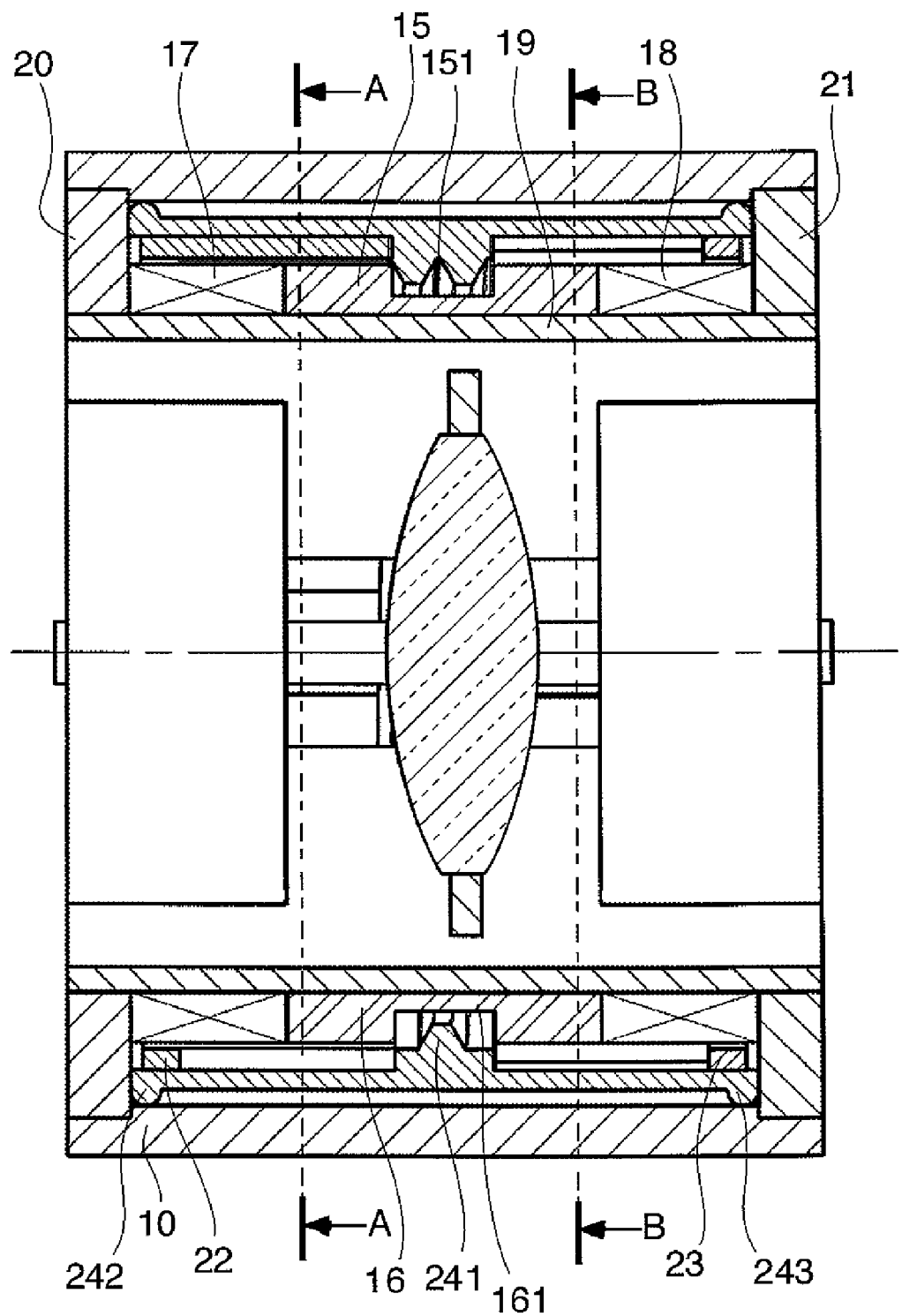
FIG. 4 is a sectional view of the lens barrel drive apparatus taken along an arrow B-B of FIG. 2 and passing through optical axis.

FIG. 1 is an exploded perspective view schematically showing the construction of a lens barrel drive apparatus according to a first embodiment of the present invention. FIG. 2 is a sectional view of the lens barrel drive apparatus in FIG. 2 in a direction perpendicular to an optical axis. FIG. 3 is a sectional view of the lens barrel drive apparatus taken along an arrow A-A of FIG. 2 and passing through the optical axis. FIG. 4 is a sectional view of the lens barrel drive apparatus taken along an arrow B-B of FIG. 2 and passing through the optical axis.

As shown in FIGS. 1 to 4, the lens barrel drive apparatus is an apparatus mounted on an image pickup apparatus, for driving a lens barrel 12, and is comprised of a base plate 10, a guide bar 13, a detent bar 14, a first magnet 15, a second magnet 16, an A-phase side coil 17, and a B-phase side coil 18. The lens barrel drive apparatus is further comprised of a stator yoke 19, an A-phase side top yoke 20, a B-phase side top yoke 21, an A-phase side rotary yoke 22, a B-phase side rotary yoke 23, and a rotor 24. It should be noted that in FIG. 2, patterns are put on the component parts as necessary so as to differentiate between them. Also, in FIG. 2, the base plate 10 and the top yoke 20 are omitted for simplification.

The base plate 10 has a cylindrical shape, and a component part of an apparatus on which the lens barrel drive apparatus is mounted are fixed to the base plate 10. If the lens barrel drive apparatus is mounted on an image pickup apparatus (a still camera or a video camera), a film or an image pickup device (a light receiving sensor such as a CCD or a C-MOS sensor) is fixed to the base plate 10.

The lens barrel 12 is for holding a lens 11 and comprised of a lens holding portion 121, a sleeve portion 122, and a detent portion 123. The lens holding portion 121 of the lens barrel 12 is shaped like a hollow disk, and the lens 11 is fixed to the hollow part. The sleeve portion 122 of the lens barrel 12, which is a substantially rectangular and extends along the optical axis, is integrally provided on an outer periphery of the lens holding portion 121.

A hole is formed at the center of the sleeve portion 122 of the lens barrel 12 in such a manner as to penetrate the sleeve portion 122 in the longitudinal direction thereof, and the guide bar 13 can be fitted in the hole. A male thread portion 122a whose central axis is the optical axis of the lens 11 is formed on a surface of the sleeve portion 122 of the lens barrel 12 which is opposed to the lens holding portion 121. The detent portion 123 of the lens barrel 12 is provided on the opposite side of the sleeve portion 122 with the lens holding portion 121 interposed therebetween, and the detent bar 14 can be fitted in the detent portion 123.

The guide bar 13 is disposed in parallel with the optical axis of the lens 11 and fitted in the hole of the sleeve portion 122 of the lens barrel 12. The detent bar 14 is disposed in parallel with the optical axis of the lens 11 and fitted in the detent portion 123 of the lens barrel 12. The guide bar 13 and the detent bar 14 are disposed with the lens 11 interposed therebetween.

The first magnet 15 is shaped like a character "C" in cross section and constitutes one magnet divided from a virtual magnet, described later, at breaks. The second magnet 16 is shaped like a character "C" in cross section and constitutes the other magnet divided from the virtual magnet, described later, at break. In the present embodiment, it is assumed that the virtual magnet has a hollow cylindrical shape formed about the optical axis and has its outer peripheral surface divided into n (in the present embodiment, n=30) magnetized portions alternately magnetized to south poles and north poles.

The virtual magnet is provided with two breaks 171 and 172 extending in the axial direction. The virtual magnet is comprised of the first magnet 15 and the second magnet 16; one divided from the virtual magnet at the break 171 is the first magnet 15, and the other one is the second magnet 16. The virtual magnet has a groove which is formed along the entire circumference and about the optical axis. Thos groove corresponds to a groove portion 151 of the first magnet and a groove portion 161 of the second magnet 16. The sleeve portion 122 is disposed in the break 171, and the guide bar 13 is disposed in the break 172.

The A-phase side coil 17 is constructed by winding a conductive wire many times around a loop formed about the optical axis and comprised of two opposing arc-shaped portions and two opposing chord-shaped portions. The A-phase side coil 17 has a so-called double-D cut shape.

The B-phase side coil 18 is identical in shape, number of wire turns, and resistance value with the A-phase side coil 17. Specifically, the B-phase side coil 18 is constructed by winding a conductive wire many times around a loop formed about the optical axis and comprised of two opposing arc-shaped portions and two opposing chord-shaped portions. The B-phase side coil 18 has a so-called double-D cut shape. The A-phase side coil 17 and the B-phase side coil 18 are wound between the lens 11 and the guide bar 13 in such a manner as to enclose the lens 11.

The stator yoke 19 is made of a soft magnetic material and has a hollow shape. The stator yoke 19 is comprised of an A-phase side coil fixing portion 19a, a first magnet fixing portion 19b, a second magnet fixing portion 19c, and a B-phase side coil fixing portion 19d. The A-phase side coil fixing portion 19d of the stator yoke 19 constitutes one end of the stator yoke 19 as viewed in the axial direction. The A-phase side coil fixing portion 19a has a so-called D-double cut shape comprised of two opposing arc-shaped portions and two opposing chord-shaped portions about the optical axis as is the case with the A-phase side coil 17. The A-phase side coil 17 is fixed to an outer periphery of the A-phase side coil fixing portion 19a.

The B-phase side coil fixing portion 19d of the stator yoke 19 constitutes the other end of the stator yoke 19 as viewed in the axial direction. The B-phase side coil fixing portion 19d is identical in shape with the A-phase side coil fixing portion 19a and has a so-called D-double cut shape formed about the optical axis and is comprised of two opposing arc-shaped portions and two opposing chord-shaped portions. The B-phase side coil 18 is fixed to an outer periphery of the B-phase side coil fixing portion 19d.

The first magnet fixing portion 19d and the second magnet fixing portion 19c of the stator yoke 19 are interposed between the A-phase side coil fixing portion 19a and the B-phase side coil fixing portion 19d. The first magnet fixing portion 19b has an arc-shaped cross section, and the first magnet 15 is fixed to an outer periphery of the first magnet fixing portion 19b. The second magnet fixing portion 19c is identical in shape with the first magnet fixing portion 19b and located on the opposite side of the first magnet fixing portion 19b with the optical axis interposed therebetween. The second magnet 16 is fixed to an outer periphery of the second magnet fixing portion 19c.

The A-phase side top yoke 20 is formed of a soft magnetic material, has a disk shape, and is comprised of a yoke fixing portion 201, a guide bar fixing hole 202, and a detent bar fixing hole 203. The yoke fixing portion 201 is an opening formed at the center of the A-phase side top yoke 20 and is substantially identical in shape and size with the inside diameter of the A-phase side coil 17. The guide bar fixing hole 202 and the detent bar fixing hole 203 are arranged with the yoke fixing portion 201 interposed therebetween, and the guide bar 13 and the detent bar 14 are to be engaged with the guide bar fixing hole 202 and the detent bar fixing hole 203, respectively.

The B-phase side top yoke 21 is identical in shape with the A-phase side top yoke 20. Specifically, the B-phase side top yoke 21 is made of a soft magnetic material, has a disk shape, and is comprised of a yoke fixing portion 211, a guide bar fixing hole 212, and a detent bar fixing hole 213. The yoke fixing portion 211 is an opening formed at the center of the B-phase side top yoke 21 and is substantially identical in shape and size with the inside diameter of the B-phase side coil 18. The guide bar fixing hole 212 and the rotation stopper bar fixing hole 213 are formed with the yoke fixing portion 211 interposed therebetween, and the guide bar 13 and the detent bar 14 are to be fitted in the guide bar fixing hole 202 and the rotation stopper bar fixing hole 213, respectively.

The A-phase side rotary yoke 22 is formed of a soft magnetic material, has a substantially cylindrical shape, and is comprised of A-phase side magnetic pole portions 221-1, 221-2, . . . 221-n/2 (see FIG. 5). Each A-phase side magnetic pole portion of the A-phase side rotary yoke 22 is formed by notching a cylindrical body and is in parallel with magnetized surfaces of the first magnet 15 and the second magnet 16. The A-phase side magnetic pole portions of the A-phase side rotary yoke 22 have a so-called toothed-comb shape extending along the optical axis.

The A-phase side magnetic pole portions 221 are comprised of 1 to n/2 comb-teeth (in the present embodiment, 15 comb-teeth) and arranged at regular intervals of 720/n° (in the present embodiment, 24°) in the circumferential direction, and each of the A-phase side magnetic pole portions 221 has a predetermined tooth width.

The B-phase side rotary yoke 23 is substantially identical in shape with the A-phase side rotary yoke 22. Specifically, the B-phase side rotary yoke 23 is formed of a soft magnetic material, has a substantially cylindrical shape, and is comprised of B-phase side magnetic pole portions 231-1, 231-2, . . . , 231-n/2 (see FIG. 5). Each B-phase side pole portion of the B-phase side rotary yoke 23 is formed by notching the cylindrical body and is in parallel with the magnetized surfaces of the first magnet 15 and the second magnet 16. The B-phase side magnetic pole portions of the B-phase side rotary yoke 23 have a so-called toothed-comb shape extending along the optical axis.

The B-phase side magnetic pole portions 231 are comprised of 1 to n/2 comb-teeth (in the present embodiment, 15 comb-teeth) and arranged at regular intervals of 720/n° (in the present embodiment, 24°) in the circumferential direction, and each of the B-phase side magnetic pole portions 231 has a predetermined tooth width.

The rotor 24 is formed of a non-magnetic and highly slidable material and has a substantially cylindrical shape. The inside diameter of the rotor 24 is approximately equal to the outside diameter of the A-phase side rotary yoke 22 (B-phase side rotary yoke 23). A female thread portion 241 is formed about the optical and in the vicinity of the central part of an inner periphery of the rotor 24 as viewed in the direction of the optical axis. Bearings 242 and 243 are disposed at an outer periphery of the rotor 24 (FIG. 4).

In the present embodiment, the female thread portion 241 is provided at the inner periphery of the rotor 24, and a male thread portion 122a which is to be engaged with the female thread portion 241 is provided in the sleeve portion 122 of the lens barrel 12. These component parts constitute a conversion mechanism that converts rotating movements of the A-phase side rotary yoke 22 and the B-phase side rotary yoke 23 into transnational motions of the lens 11 along the optical axis.

Next, a description will be given of a stator and a rotor of a drive unit of the lens barrel drive apparatus according to the present embodiment.

The A-phase side top yoke 20 is disposed at one end of the inner periphery of the base plate 10, and the B-phase side top yoke 21 is disposed at the other end of the inner periphery of the base plate 10. The yoke fixing portion 201 of the A-phase side top yoke 20 and the yoke fixing portion 211 of the B-phase side top yoke 21 support the stator yoke 19. Further, the A-phase side coil 17, the first magnet 15, the second magnet 16, and the B-phase side coil 18 are fixed to the outer periphery of the stator yoke 19. These component parts constitute the stator of the drive unit of the lens barrel drive apparatus.

The guide bar 13 and the detent bar 14 are supported by the A-phase side top yoke 20 and the B-phase side top yoke 21. As shown in FIGS. 2 and 4, the guide bar 13 and the detent bar 14 are arranged in spaces between the first magnet 15 and the second magnet 16, i.e. at breaks 171 and 172 of the virtual magnet. Thus, the guide bar 13, the detent bar 14, the first magnet 15, and the second magnet 16 can be arranged in substantially the same diameter. Further, interference between the guide bar 13 and the first and second magnets 15, 16 and interference between the detent bar 14 and the first and second magnets 15, 16 can be prevented.

As shown in FIGS. 2 and 3, the guide bar 13 and the detent bar 14 are arranged outside the chord-shaped portions of the A-phase side coil 17 and the B-phase side coil 18. Thus, the guide bar 13, the detent bar 14, the A-phase side coil 17, and the B-phase side coil 18 can be arranged in substantially the same diameter. Further, interference between the guide bar 13 and the A-phase and B-phase side coils 17, 18 and interference between the detent bar 14 the A-phase and B-phase side coils 17, 18 can be prevented.

The rotor of the drive unit of the lens barrel drive apparatus is constructed by fixing the A-phase side coil 17 and the B-phase side coil 18 to the inner periphery of the rotor 24. In this case, the A-phase side magnetic pole portions 221 of the A-phase side coil 17 and the B-phase side magnetic pole portions 231 of the B-phase side coil 18 are fixed at predetermined angles, described later.

The bearings 242 and 243 of the rotor 24 abutting on an inner peripheral surface of the base plate 10 (FIG. 4) rotatively support the A-phase side rotary yoke 22 with respect to the first magnet 15 and the second magnet 16 fixed to the base plate 10. A mechanism such as an elastic spring or a magnetic spring, not shown, limits the movement of the A-phase side rotary yoke 22 along the optical axis with respect to the stator.

The engagement of the guide bar 13 with the hole of the sleeve portion 122 of the lens barrel 12 supports the lens barrel 12 such that the lens barrel 12 is movable straight in the axial direction with respect to the base plate 10. Also, the engagement of the detent bar 14 with the detent portion 123 of the lens barrel 12 limits the rotation of the lens barrel 12 with respect to the base plate 10, and thus, the lens barrel 12 can freely move only in a straight line. The male thread portion 122*a* of the sleeve portion 122 of the lens barrel 12 and the female thread portion 241 of the rotor 24 act to move the lens barrel 12 along the optical axis with rotation of the rotor 24.

In this case, the sleeve portion 122 of the lens barrel 12 moves forward and backward in the space between the first magnet 15 and the second magnet 16 (the breaks 171 and 172 of the virtual magnet), i.e. the space outside the chord-shaped portions of the A-phase side coil 17 and the B-phase side coil 18 as shown in FIG. 2. Thus, interference between the sleeve portion 122 of the lens barrel 12 and the first and second magnets 15, 16, and interference between the sleeve portion 122 of the lens barrel 12 and the A-phase and B-phase side coils 17, 18 can be prevented.

Also, as shown in FIG. 4, the female thread portion 241 of the rotor 24 moves on the groove portion 151 of the first magnet 15 and the groove portion 161 of the second magnet 16. Thus, interference between the female thread portion 241 of the rotor 24 and the first and second magnets 15, 16 can be prevented.

A description will be given of a drive principle for rotating the rotor with respect to the stator in the lens barrel drive apparatus according to the present embodiment.

A magnetic flux generated by energization of the A-phase side coil 17 forms a magnetic path around the A-phase side top yoke 20, the A-phase side magnetic pole portions 221 of the A-phase side rotary yoke 22, the first magnet 15, the second magnet 16, and the stator yoke 19.

In the magnetic path, there are only two gaps: (1) a gap between the A-phase side top yoke 20 and the A-phase side rotary yoke 22, and (2) a gap between the A-phase side magnetic pole portions 221 of the A-phase side rotary yoke 22 and the first magnet 15 and the second magnet 16. The magnetic flux formed by the A-phase side coil 17 effectively acts on the first magnet 15 and the second magnet 16. At this time, poles to be magnetized in the A-phase side magnetic pole portions opposed to the first magnet 15 and the second magnet 16 can be selected according to the direction in which electric current is passed through the A-phase side coil 17.

Similarly, a magnetic flux generated by energization of the B-phase side coil 18 forms a magnetic path around the B-phase side top yoke 21, the B-phase side magnetic pole portions of the B-phase side rotary yoke 23, the first magnet 15, the second magnet 16, and the stator yoke 19. At this time, poles to be energized in the B-phase side magnetic pole portions opposed to the first magnet 15 and the second magnet 16 can be selected according to the direction in which electric current is passed through the B-phase side coil 17.

FIGS. 5A to 8B are diagrams showing the relationship in angular position between the A-phase side magnetic pole portions 221 of the A-phase side rotary yoke 22, the B-phase side magnetic pole portions 231 of the B-phase side rotary yoke 23, the first magnet 15, and the second magnet 16 in respective energized states. FIGS. 5A, 6A, 7A, 8A, and 9A are sectional views taken along an arrow A-A in FIG. 4, and FIGS. 5B, 6B, 7B, 8B, and 9B are sectional views taken along an arrow B-B in FIG. 4. Here, a phase difference between the A-phase side magnetic pole portions 221 and the B-phase side magnetic pole portions 231 is $180°/n$ (n is the number of poles of the virtual magnet; in the present embodiment, 6°).

Figure 5A:
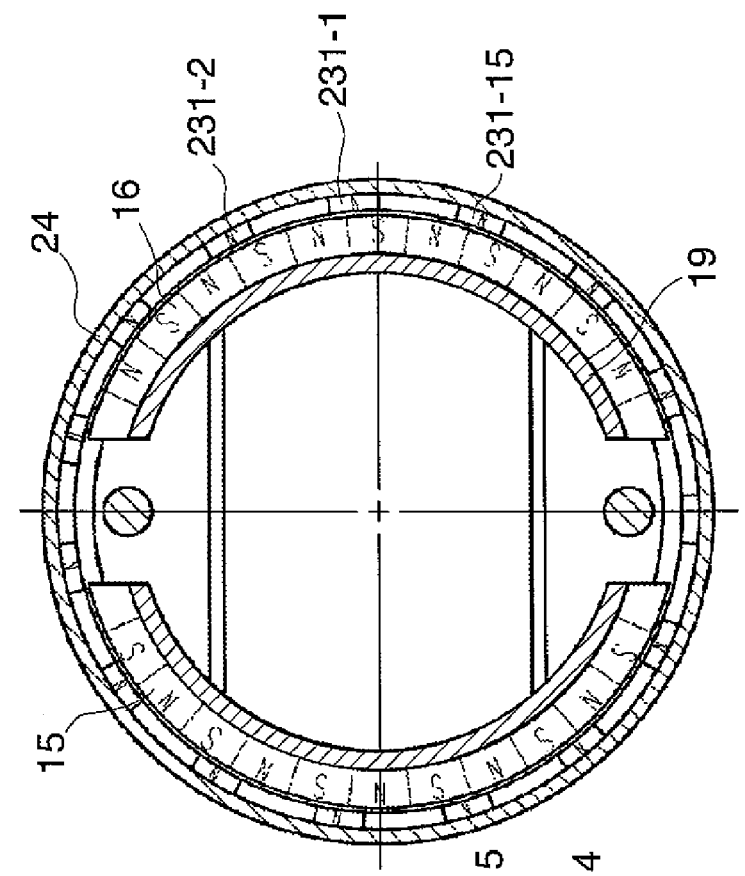
FIG. 5A is a sectional view taken along an arrow A-A in FIG. 4 in a state in which forward electric current is passed through an A-phase side coil, and forward electric current is passed through a B-phase side coil.
Figure 5B:
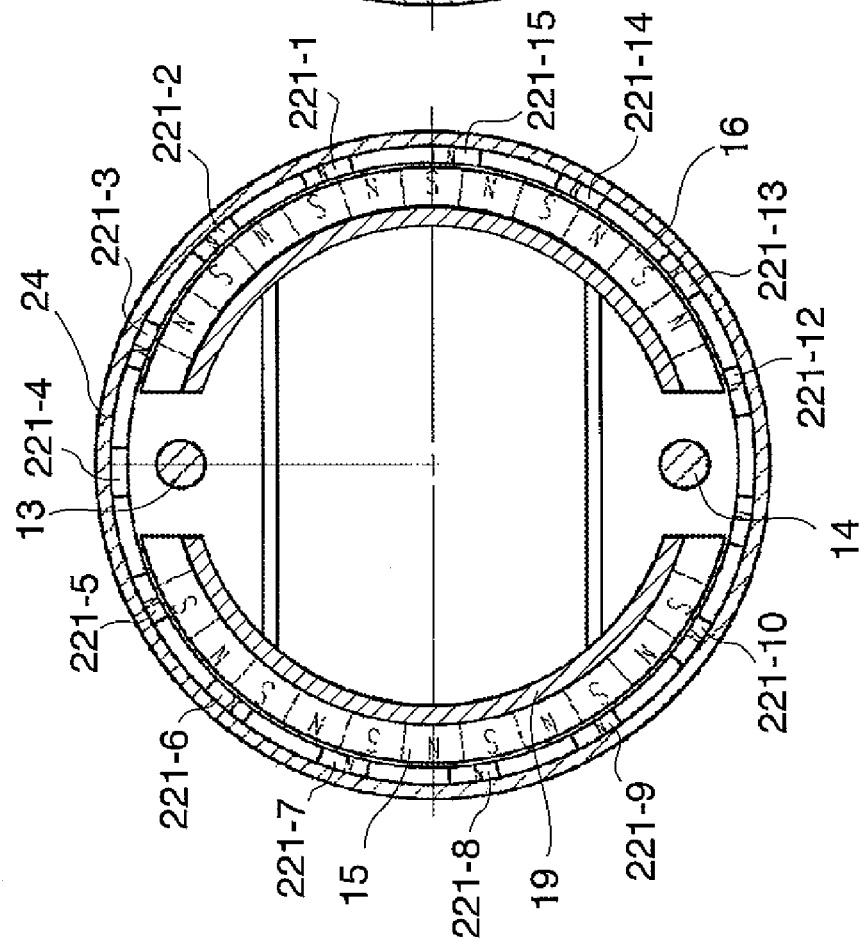
FIG. 5B is a sectional view taken along an arrow B-B in FIG. 4 in a state in which forward electric current is passed through the A-phase side coil, and forward electric current is passed through the B-phase side coil.

FIGS. 5A and 5B show a state in which forward electric current is passed through the A-phase side coil 17, and forward electric current is passed through the B-phase side coil 18. As a result of the energization, the A-phase side magnetic pole portions 221 are magnetized into north poles, and the B-phase side magnetic pole portions 231 are magnetized into north poles. At this time, the rotor 24 stabilizes in an angular position shown in FIGS. 5A and 5B due to a magnetic balance between the magnetized A-phase side coil 17 and B-phase side coil 18, the first magnet 15, and the second magnet 16.

Figures 6A, 6B:
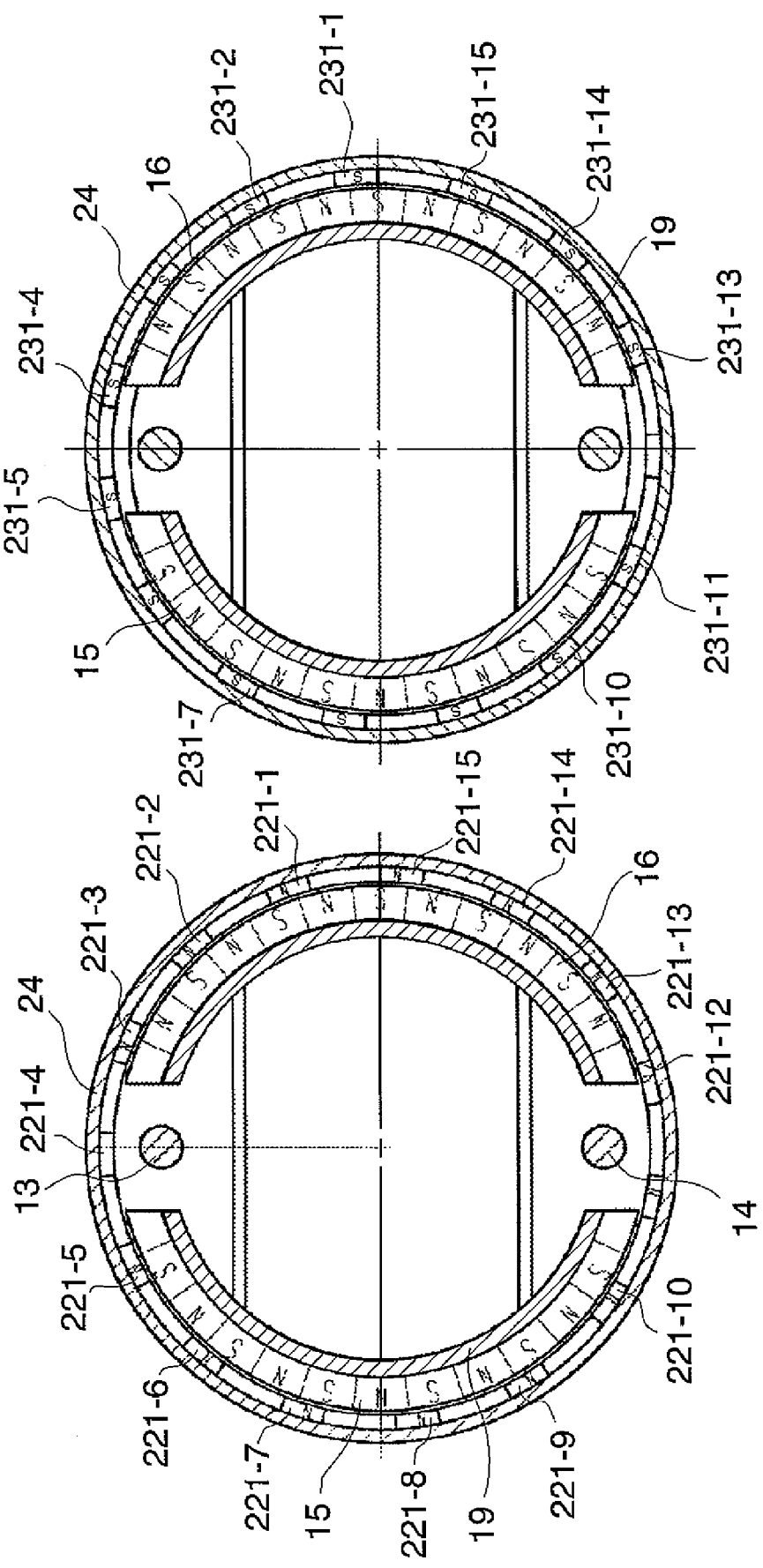
FIG. 6A is a sectional view taken along the arrow A-A in FIG. 4 in a state in which forward electric current is passed through the A-phase side coil, and backward electric current is passed through the B-phase side coil.
FIG. 6B is a sectional view taken along the arrow B-B in FIG. 4 in a state in which forward electric current is passed through the A-phase side coil, and backward electric current is passed through the B-phase side coil.

FIGS. 6A and 6B show a state in which forward electric current is passed though the A-phase side coil 17, and backward electric current is passed though the B-phase side coil 18. As a result of the energization, the A-phase side magnetic pole portions 221 are magnetized into north poles, and the B-phase side magnetic pole portions 231 are magnetized into south poles. The rotor 24 is rotated through an angle of $1 \times 180/n°$ (in the present embodiment, 6°) from the position shown in FIGS. 5A and 5B and stably positioned at an angular position shown in FIGS. 6A and 6B.

Figure 7A:
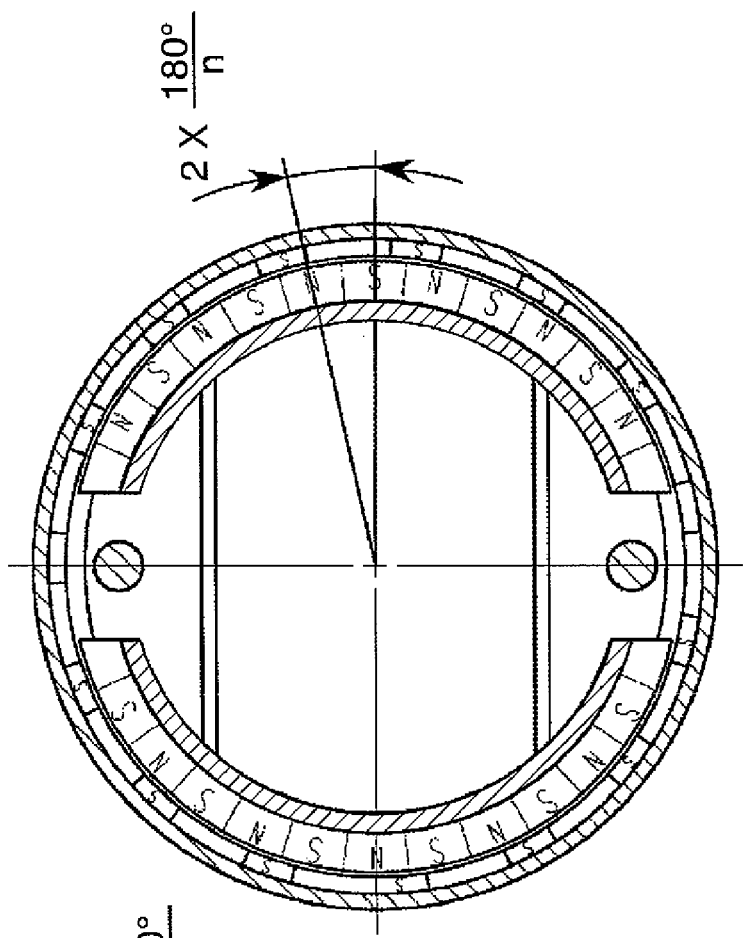
FIG. 7A is a sectional view taken along the arrow A-A in FIG. 4 in a state in which backward electric current is passed through the A-phase side coil, and backward electric current is passed through the B-phase side coil.
Figure 7B:
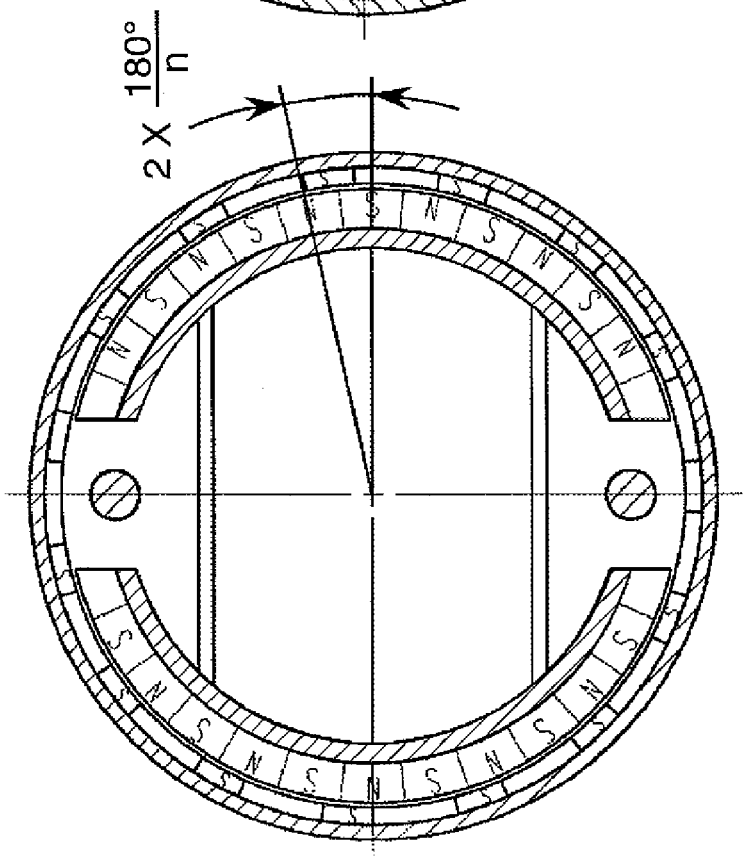
FIG. 7B is a sectional view taken along the arrow B-B in FIG. 4 in a state in which backward electric current is passed through the A-phase side coil, and backward electric current is passed through the B-phase side coil.

FIGS. 7A and 7B show a state in which backward electric current is passed though the A-phase side coil 17, and backward electric current is passed though the B-phase side coil 18. As a result of the energization, the A-phase side magnetic pole portions 221 are magnetized into south poles, and the B-phase side magnetic pole portions 231 are magnetized into south poles. The rotor 24 is rotated through an angle of $2 \times 180/n°$ (in the present embodiment, 12°) from the position shown in FIGS. 5A and 5B and is stably positioned at an angular position shown in FIGS. 7A and 7B.

Figure 8A:
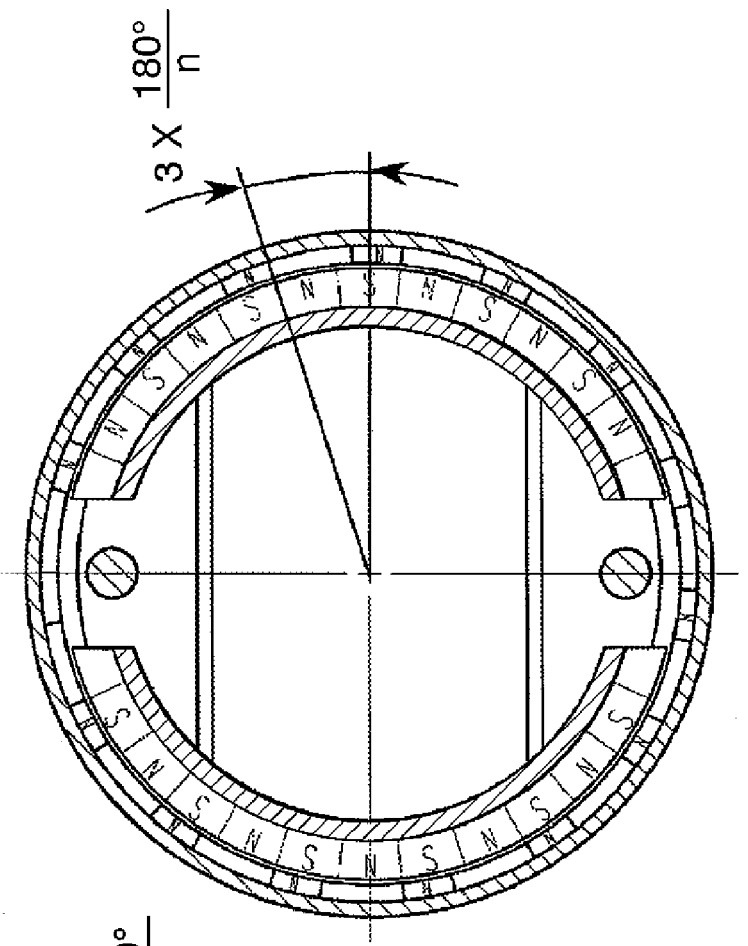
FIG. 8A is a sectional view taken along the arrow A-A in FIG. 4 in a state in which backward electric current is passed through the A-phase side coil, and forward electric current is passed through the B-phase side coil.
Figure 8B:
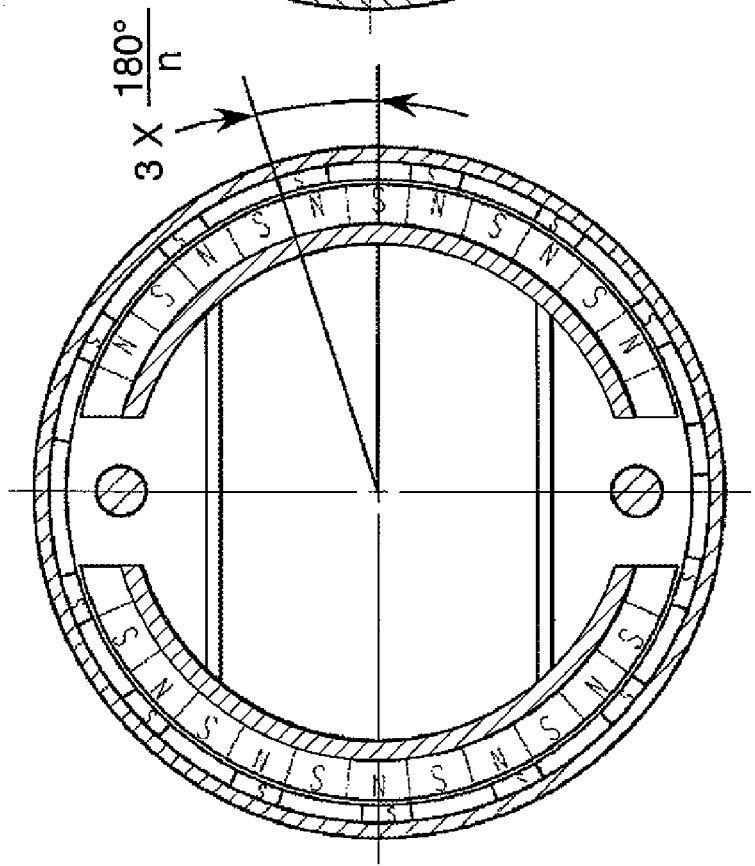
FIG. 8B is a sectional view taken along the arrow B-B in FIG. 4 in a state in which backward electric current is passed through the A-phase side coil, and forward electric current is passed through the B-phase side coil.

FIGS. 8A and 8B show a state in which backward electric current is passed though the A-phase side coil 17, and forward electric current is passed though the B-phase side coil 18. As a result of the energization, the A-phase side magnetic pole portions 221 are magnetized into south poles, and the B-phase side magnetic pole portions 231 are magnetized into north poles. The rotor 24 is rotated through an angle of $3 \times 180/n°$ (in the present embodiment, 18°) from the position shown in FIGS. 5A and 5B and is stably positioned at an angular position shown in FIGS. 8A and 8B.

Next, forward electric current is passed through the A-phase side coil 17, and forward electric current is passed through the B-phase side coil 18 again. The rotor 24 is stably positioned at an angular position rotated through an angle of $4 \times 180/n°$ (in the present embodiment, 24°) from the position shown in FIGS. 5A and 5B. At this time, the rotor 24 has been rotated through an angle corresponding to one magnetic pole tooth, and hence the rotor 24 is positioned as shown in FIGS. 5A and 5B.

As described above, by sequentially changing the directions in which electric current is passed through the A-phase side coil 17 and the B-phase side coil 18, the position in which the rotor 24 stabilizes can be sequentially changed to rotate the rotor 24. When the rotor 24 rotates, the female thread portion 241 provided in the rotor 24 and the male thread portion 122a formed in the sleeve portion 122 of the lens barrel 12 act to move the lens barrel 12 forward and backward along the optical axis with the rotation of the rotor 24. It should be noted that a cam groove may be formed in the rotor 24, and a drive pin may be provided in the sleeve portion 122 of the lens barrel so as to convert rotating movements of the rotor 24 into the forward and backward movement of the lens barrel 12 along the optical axis.

As described above, according to the present embodiment, in the lens barrel drive apparatus, the guide bar 13 and the detent bar 14 are disposed in the breaks between the first magnet 15 and the second magnet 16 and outside the chord-shaped portions of the A-phase side coil 17 and the B-phase side coil 18. Thus, the guide bar 13, the detent bar 14, the first magnet 15, the second magnet 16, the A-phase side coil 17, and the B-phase side coil 18 can be arranged in substantially the same diameter. As a result, reduction in the diameter of the lens barrel drive apparatus can be realized. Further, interference of the guide bar 13 and the detent bar 14 and the above-mentioned component parts can be prevented.

Figure 20A:
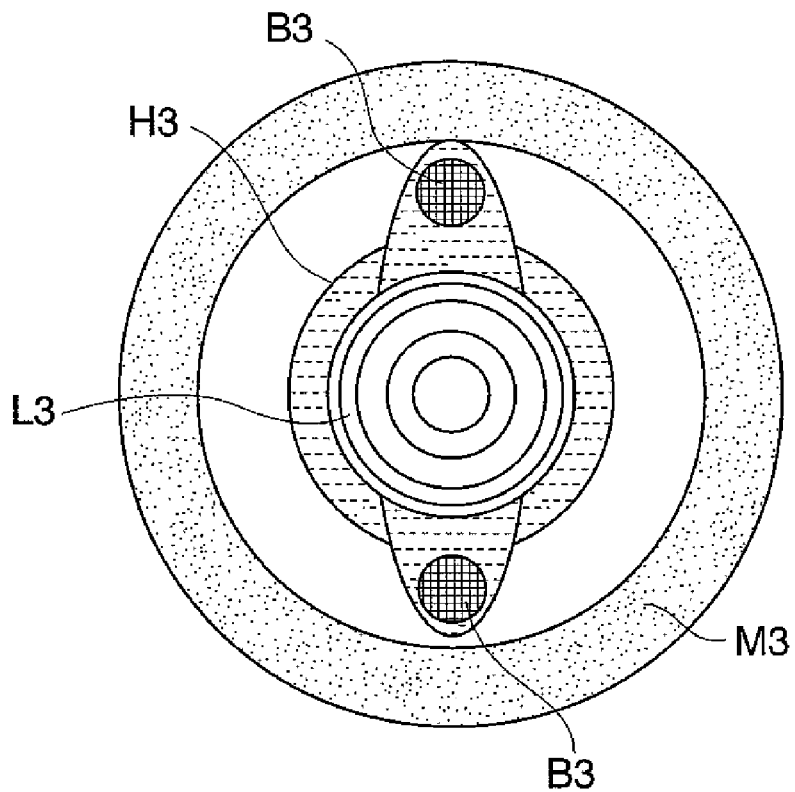
FIG. 20A is a front view showing another conventional lens barrel drive apparatus as viewed in the direction of an optical axis in a case where guide bars are disposed inside a hollow motor.
Figure 20B:
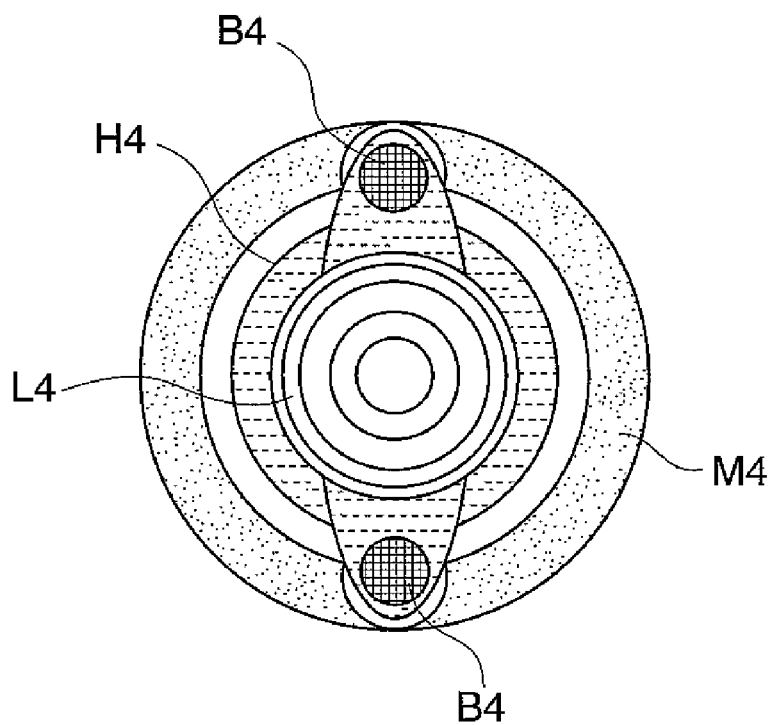
FIG. 20B is a front view showing another conventional lens barrel drive apparatus as viewed in the direction of an optical axis in a case where guide bars are disposed inside notches of a hollow motor.

In general, in a case where a lens barrel supported by guide bars is driven using a hollow cylindrical motor, it is necessary to notch the motor and prevent interference with the guide bars so as to make a lens barrel drive apparatus small in diameter. In this case, even if notches are formed in the rotor side of the motor, the rotor rotates with respect to the guide bars, and hence interference with the guide bars cannot be prevented. To prevent interference with the guide bars, it is necessary to form notches in the stator side of the motor. Accordingly, it is preferred that the rotor of the motor is made thin so as to implement, for example, an arrangement shown in FIG. 20B in the lens barrel drive apparatus.

In the case where a stepping motor using a magnet as a rotor as in the conventional lens barrel drive apparatus, the thickness of the magnet as the rotor is required to be not less than 0.5 mm from the standpoint of strength and magnetic intensity.

On the other hand, in the present embodiment, the A-phase side rotary yoke 22 having the A-phase side magnetic pole portions 221 and the B-phase side rotary yoke 23 having the B-phase side magnetic pole portions 231 are fixed to the inner periphery of the rotor 24. That is, the A-phase side rotary yoke 22 and the B-phase side rotary yoke 23 are fixed to the inner periphery of the rotor 24 to construct the rotor in the drive unit of the lens barrel drive apparatus. Accordingly, the thickness of the rotor 24 can be reduced to about 0.15 mm. Thus, the rotor can be made thinner than before, and this is advantageous in reducing the diameter of the entire lens barrel drive apparatus.

Also, in the present embodiment, since the A-phase side rotary yoke 22 having the A-phase side magnetic pole portions 221 and the B-phase side rotary yoke 23 having the B-phase side magnetic pole portions 231 are fixed to the inner periphery of the rotor 24 as described above, the rotor can be disposed at the outermost periphery or innermost periphery of the lens barrel drive apparatus. This is advantageous for reducing the diameter of the lens barrel drive apparatus.

On the other hand, in a case where a lens barrel is driven using the above-mentioned conventional stepping motor, a yoke, a coil, or the like is disposed outside a magnet which is a rotor. Thus, guide bars are disposed outside a lens, the rotor is disposed outside the guide bars, and the coil or yoke is disposed outside the rotor, and hence it is difficult to make the entire lens barrel drive apparatus small in diameter.

On the other hand, in the present embodiment, the guide bar 13 is disposed outside the lens 11, and only the thin rotor 24 is disposed outside the guide bar 13. This can realize reduction in the diameter of the lens barrel drive apparatus. Also, the stator of the lens barrel drive apparatus can be disposed inside the rotor 24 in such a manner as to prevent interference with the guide bar 13, reduction in the diameter of the lens barrel drive apparatus can be realized.

Also, in the present embodiment, since the rotor is disposed at the outer periphery, magnets having outer peripheral surfaces magnetized can be used as the first magnet 15 and the second magnet 16. Since magnets having their outer peripheral surfaces magnetized can be manufactured more easily and their magnetic intensities can be easily increased as compared with magnets having their inner peripheral surfaces magnetized, the efficiency of the lens barrel drive apparatus can be improved.

Figure 9:
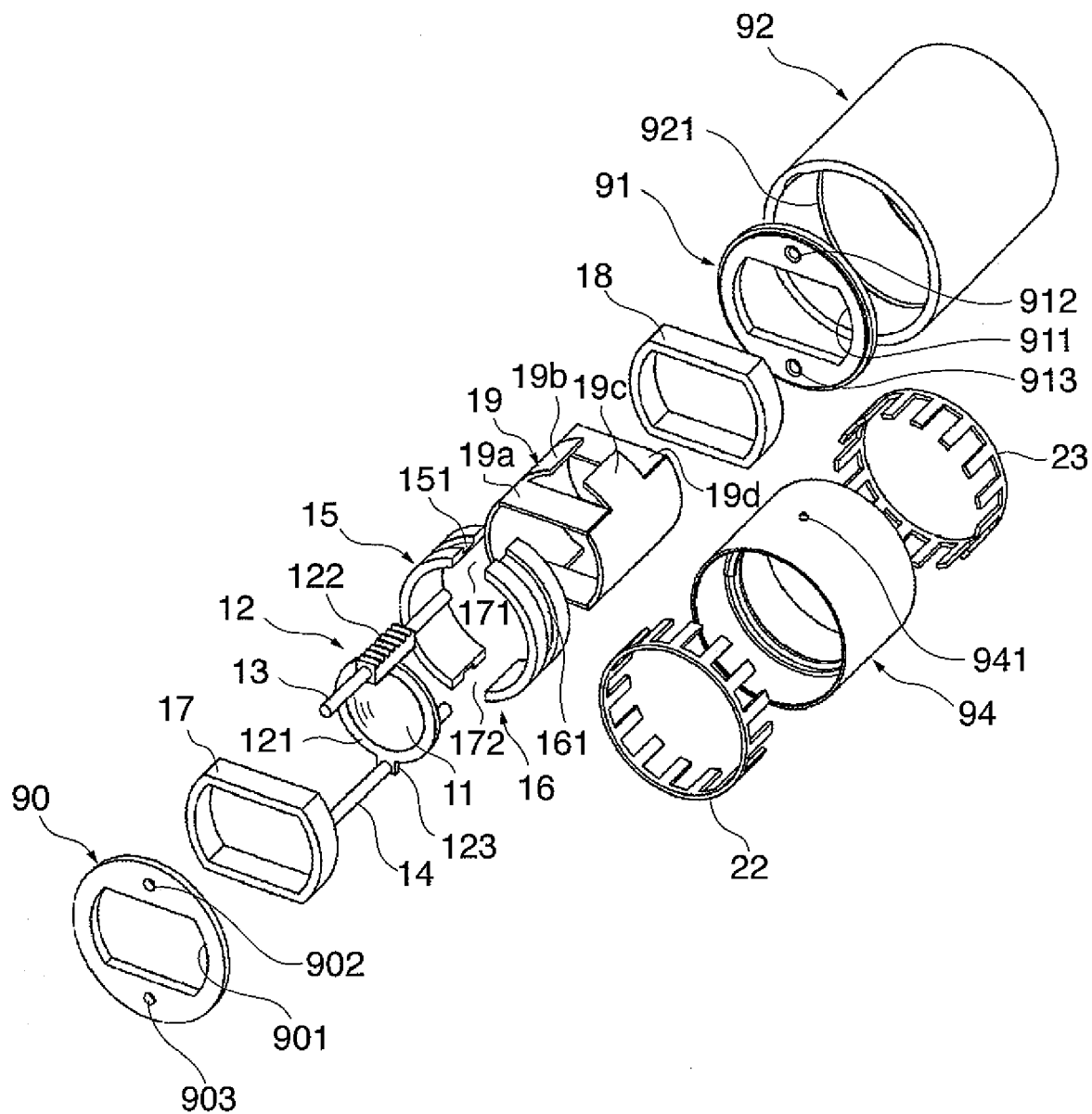
FIG. 9 is an exploded perspective view schematically showing the construction of a lens barrel drive apparatus according to a second embodiment of the present invention.
Figure 10:
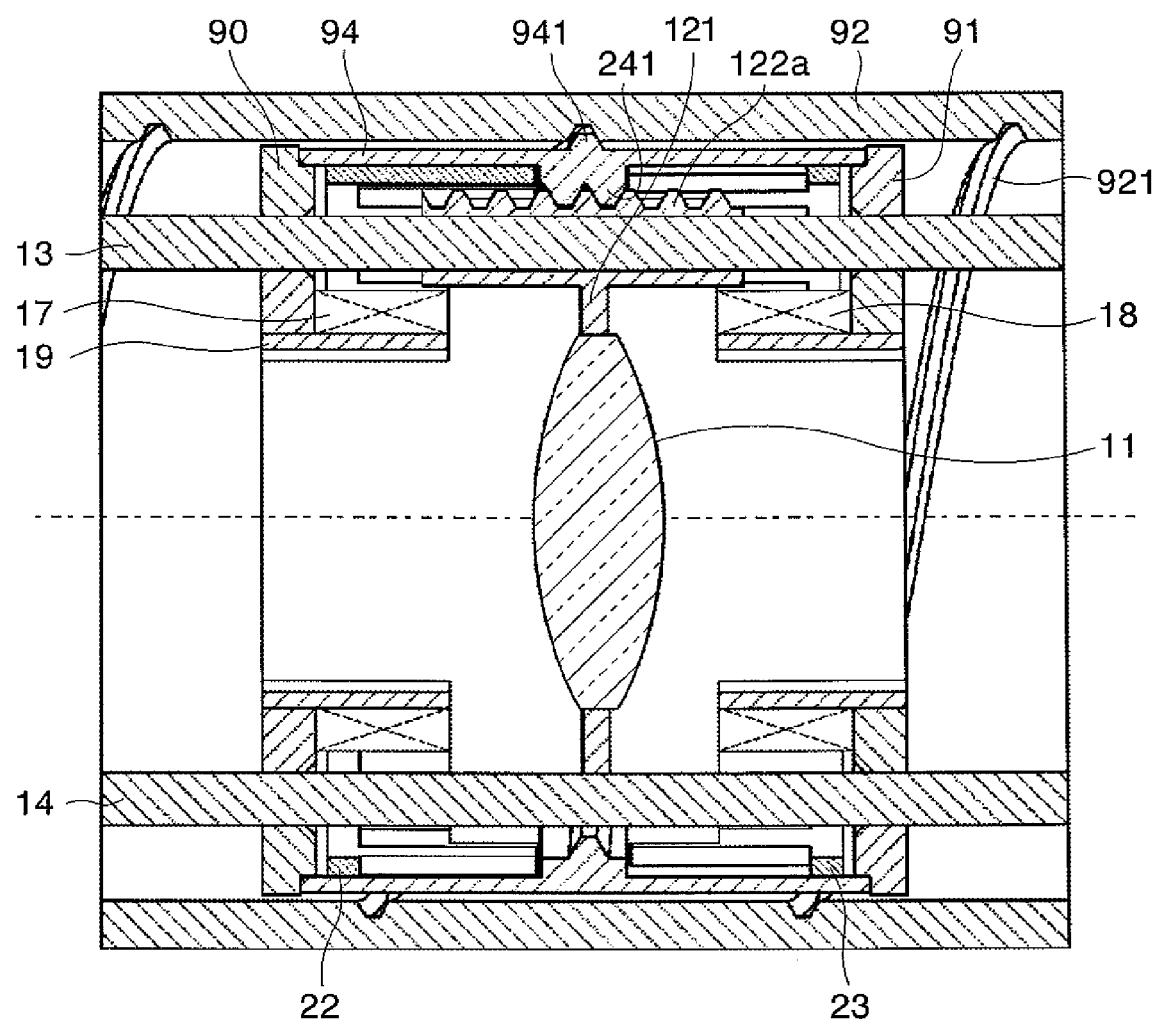
FIG. 10 is a sectional view of the lens barrel drive apparatus in FIG. 9 passing through an optical axis.

FIG. 9 is an exploded perspective view schematically showing the construction of a lens barrel drive apparatus according to a second embodiment of the present invention. FIG. 10 is a sectional view of the lens barrel drive apparatus in FIG. 9 passing through an optical axis.

As shown in FIGS. 9 and 10, the lens barrel drive apparatus is an apparatus mounted on an image pickup apparatus, for driving a lens barrel 12, and is comprised of a base plate 92, a guide bar 13, a detent bar 14, a first magnet 15, a second magnet 16, an A-phase side coil 17, and a B-phase side coil 18. The lens barrel drive apparatus is further comprised of a stator yoke 19, an A-phase side top yoke 90, a B-phase side top yoke 91, an A-phase side rotary yoke 22, a B-phase side rotary yoke 23, and a rotor 94.

The lens barrel drive apparatus according to the present embodiment differs in the following points from the above-described first embodiment. Component parts of the lens barrel drive apparatus according to the present embodiment corresponding to those of the above-described first embodiment (FIG.1) are denoted by the same reference numerals, and description thereof is omitted.

In the above-described first embodiment, the female thread portion 241 is provided at the inner periphery of the rotor 24, and the male thread portion 122a is provided in the sleeve portion 122 of the lens barrel 12. These component parts constitute the conversion mechanism that converts rotating movements of the A-phase side rotary yoke 22 and the B-phase side rotary yoke 23 into forward and backward movements of the lens along the optical axis. The conversion mechanism, however, is not limited to this, but may be constructed such that an inner peripheral side engaging portion (a female thread portion or a cam groove or a drive pin) is provided at the inner periphery of the base plate, and an outer peripheral side engaging portion (a male thread portion or a drive pin or a cam groove) is provided at the outer periphery of the rotor.

In the present embodiment, a cam groove 921 is formed at the inner periphery of the base plate 92, and a drive pin 941 is provided at the outer periphery of the rotor 94. These component parts constitute a conversion mechanism that converts rotating movements of the A-phase side rotary yoke 22 and the B-phase side rotary yoke 23 into forward and backward movements of the lens along the optical axis. Alternatively, the above-mentioned conversion mechanism and the arrangement that the stator yoke 19 holds the lens 11 (the lens barrel 12 is not provided) may be used in combination.

The base plate 92 has the cam groove 921 at the inner periphery thereof. The base plate 92 fixes the guide bar 13 and the detent bar 14 using a mechanism, not shown. The A-phase side top yoke 90 and the B-phase side top yoke 91 are disposed at the inner periphery of the base plate 92. The rotor 94 has the drive pin 941 at the outer periphery thereof and the female thread portion 241 at the inner periphery thereof.

In the present embodiment, the A-phase side top yoke 90 and the B-phase side top yoke 91 are disposed at the inner periphery of the base plate 92, and yoke fixing portions 901 and 911 of the A-phase side top yoke 90 and the B-phase side top yoke 91 support the stator yoke 19. Further, the A-phase side coil 17, the first magnet 15, the second magnet 16, and the B-phase side coil 18 are fixed to the outer periphery of the stator yoke 19. These component parts constitute a stator of a drive unit of the lens barrel drive apparatus. Also, the A-phase side rotary yoke 22 and the B-phase side rotary yoke 23 are fixed to the inner periphery of the rotor 94 to construct a rotor of the drive unit of the lens barrel drive apparatus.

The stator is supported in such a manner as to be movable only along the optical axis with respect to the base plate 92. The rotor is supported in such a manner as to be rotatable only about the optical axis with respect to the stator. Thus, when the rotor is rotated, the cam groove 921 formed at the inner periphery of the base plate 92 and the drive pin 94 disposed at the outer periphery of the rotor 94 act to move the stator and the rotor along the optical axis with respect to the base plate 92. At the same time, the male thread portion 122a formed in the sleeve portion 122 of the lens barrel 12 and the female thread portion 241 formed in the rotor 94 act to move the lens barrel 12 along the optical axis with respect to the rotor.

As described above, according to the present embodiment, in the lens barrel drive apparatus, the guide bar 13 and the detent bar 14 are disposed in the breaks 171 and 172 between the first magnet 15 and the second magnet 16 and outside the chord-shaped portions of the A-phase side coil 17 and the B-phase side coil 18. As a result, the guide bar 13, the detent bar 14, the first magnet 15, the second magnet 16, the A-phase side coil 17, and the B-phase side coil 18 can be arranged in substantially the same diameter. Thus, reduction in the diameter of the lens barrel drive apparatus can be realized. Further, interference of the guide bar 13 and the detent bar 14 and the above-mentioned component parts can be prevented.

Also, a so-called two-level collapsing system can be realized in which the stator and the rotor move along the optical axis with respect to the base plate 92, and the lens barrel 12 moves along the optical axis with respect to the rotor. Since, there are two moving parts which move along the optical axis, the moving distance of the lens barrel 12 can be increased as compared with the above-described first embodiment.

On the other hand, power required for driving the lens barrel 12 is increased as compared with the above-described first embodiment because resistance is increased due to the increased weight of moving parts as well as the movable conductive wires of the A-phase side coil 17 and the B-phase side coil 18.

Figure 11:
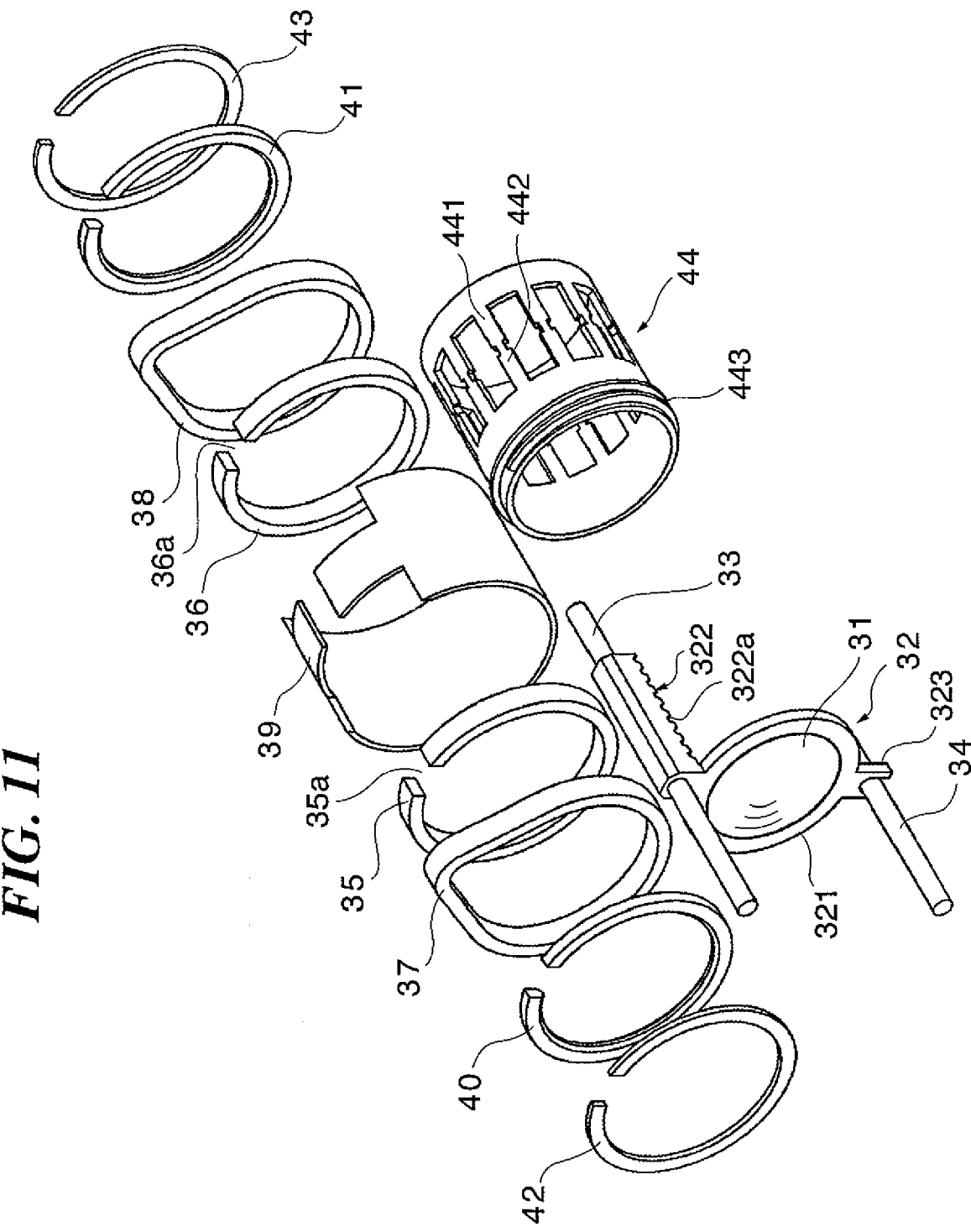
FIG. 11 is an exploded perspective view schematically showing the construction of a lens barrel drive apparatus according to a third embodiment of the present invention.
Figure 12:
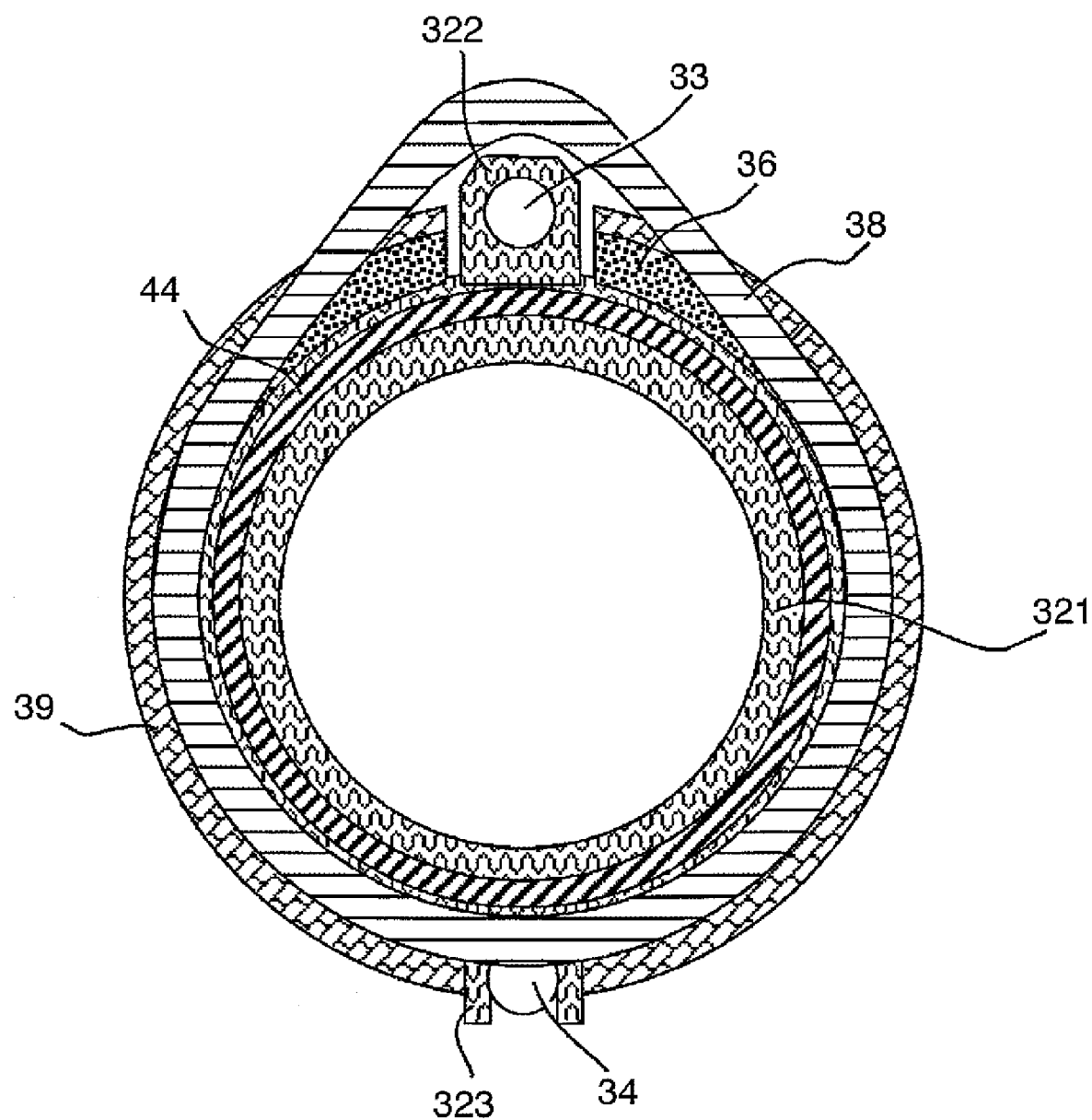
FIG. 12 is a sectional view of the lens barrel drive apparatus in FIG. 11 in a direction perpendicular to the optical axis.
Figure 13:
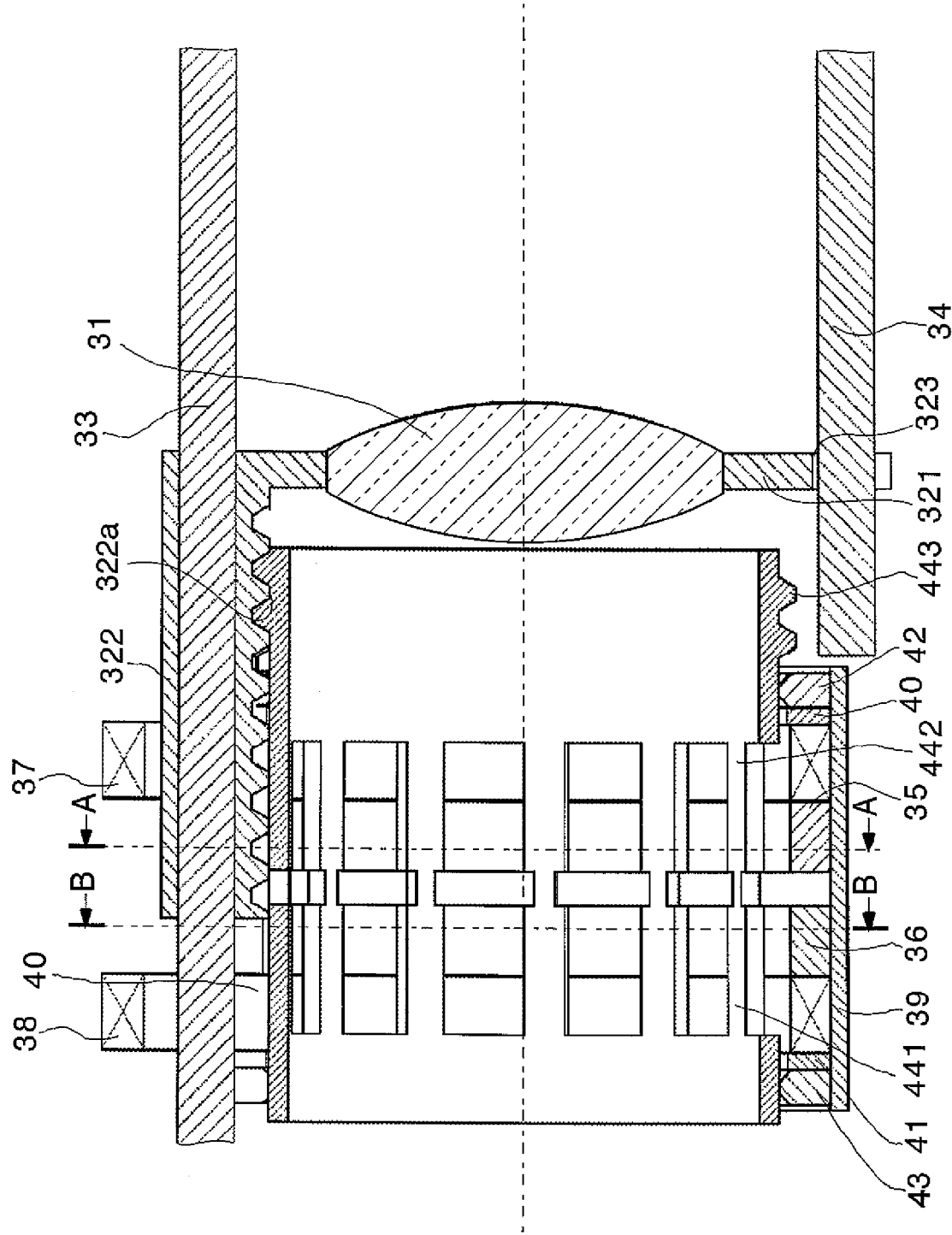
FIG. 13 is a sectional view of the lens barrel drive apparatus in FIG. 11 passing through an optical axis.

FIG. 11 is an exploded perspective view schematically showing the construction of a lens barrel drive apparatus according to a third embodiment of the present invention. FIG. 12 is a sectional view of the lens barrel drive apparatus in FIG. 11 in a direction perpendicular to the optical axis. FIG. 13 is a sectional view of the lens barrel drive apparatus in FIG. 11 passing through an optical axis.

As shown in FIGS. 11 to 13, the lens barrel drive apparatus is an apparatus mounted on an image pickup apparatus, for driving a lens barrel 32, and is comprised of a guide bar 33, a rotation stopper bar 34, an A-phase side magnet 35, a B-phase side magnet 36, an A-phase side coil 37, and a B-phase side coil 38. The lens barrel drive apparatus is further comprised of a stator yoke 39, an A-phase side top yoke 40, a B-phase side top yoke 41, an A-phase side bearing 42, a B-phase side bearing 43, and a rotary yoke 44.

The lens barrel 32 is for holding a lens 31 and comprised of a lens holding portion 321, a sleeve portion 322, and a rotation stopper portion 323. The lens holding portion 321 of the lens barrel 32 is shaped like a hollow disk, and the lens 31 is fixed to the hollow part. The sleeve portion 322 of the lens barrel 32 has a substantially rectangular shape extending along the optical axis and is integrally provided on an outer periphery of the lens holding portion 321.

A hole is formed at the center of the sleeve portion 322 of the lens barrel 32 in such a manner as to penetrate the sleeve portion 322 in the longitudinal direction thereof, and the guide bar 33 can be fitted in the hole. A male thread portion 322a whose central axis is the optical axis of the lens 31 is formed on a surface of the sleeve portion 322 of the lens barrel 32 which is opposed to the optical axis of the lens 31. The rotation stopper portion 323 of the lens barrel 32 is provided on the opposite side of the sleeve portion 322 with the lens holding portion 321 interposed therebetween, and the rotation stopper bar 34 can be fitted in the rotation stopper portion 323.

The guide bar 33 is disposed in parallel with the optical axis of the lens 31 and is fitted the hole of the sleeve portion 322 of the lens barrel 32. The rotation stopper bar 34 is disposed in parallel with the optical axis of the lens 31 and fitted in the hole of the rotation stopper portion 323 of the lens barrel 32. The guide bar 33 and the rotation stopper bar 34 are fixed to a base plate, not shown.

The A-phase side magnet 35 is substantially annular in cross section and is formed by removing a break from a first virtual magnet described below. In the present embodiment, it is assumed that the first virtual magnet has a hollow cylindrical shape (annular shape), whose central axis is the optical axis, and has an outer peripheral surface divided into n magnetized portions alternately magnetized to south poles and north poles.

The first virtual magnet is provided with a break 35a extending along the optical axis. A column which is formed by removing the break 35a from the first virtual magnet and shaped like a character "C" in cross section is the A-phase side magnet 35. The sleeve portion 322 of the lens barrel 32 and the guide bar 33 are disposed in the break 35a of the A-phase side magnet 35.

The B-phase side magnet 36 is substantially annular in cross section and is formed by removing a break from a second virtual magnet described below. In the present embodiment, it is assumed that the second virtual magnet has a hollow cylindrical shape (annular shape), whose central axis is the optical axis, and has an inner peripheral surface divided into n magnetized portions alternately magnetized to south poles and north poles. Here, the first virtual magnet and the second virtual magnet are fixed with a predetermined phase difference, described later.

The second virtual magnet is provided with a break 36a extending along the optical axis. A column which is formed by removing the break 36a from the second virtual magnet and shaped like a character "C" in cross section is the B-phase side magnet 36.

The sleeve portion 322 of the lens barrel 32 and the guide bar 33 are disposed in the break 36a of the B-phase side magnet 36.

The A-phase side coil 37 is constructed by winding a conductive wire many times around a water droplet-shaped loop comprised of a cylindrical portion formed about the optical axis and a projected portion passing through the guide bar 33. The B-phase side coil 38 is identical in shape, number of wire turns, and resistance value with the A-phase side coil 37. The A-phase side coil 37 and the B-phase side coil 38 are wound in such a manner as to enclose the lens 31 and the guide bar 33.

The stator yoke 39 is formed of a soft magnetic material, has a hollow cylindrical shape, and has an inside diameter approximately equal to the outside diameters of the cylindrical portions of the A-phase side coil 37 and the B-phase side coil 38. The stator yoke 39 is also provided with a notch extending along the optical axis so as to prevent interference with the projected portion of the A-phase side coil 37, the guide bar 33, and the projected portion of the B-phase side coil 38.

The A-phase side top yoke 40 is formed of a soft magnetic material and has a substantially annular shape. The A-phase side top yoke 40 has an outside diameter approximately equal to the inside diameter of the stator yoke 39 and has an inside diameter slightly greater than the outside diameter of the rotary yoke 44. The A-phase side top yoke 40 is also provided with a notch extending along the optical axis so as to prevent interference with the guide bar 33. The B-phase side top yoke 41 is identical in shape with the A-phase side top yoke 40.

The A-phase side bearing 42 is formed of a highly slidable and nonmagnetic material and provided with a notch so as to prevent interference with the guide bar 33. The B-phase side bearing 43 is identical in shape with the A-phase side bearing 42.

The rotary yoke 44 is formed of a soft magnetic material and has a hollow cylindrical shape. The rotary yoke 44 is comprised of A-phase side magnetic pole portions 441, B-phase side magnetic pole portions 442, and a male thread portion 443. The peripheral surface of the rotary yoke 44 has a plurality of slits formed therein to constitute a so-called comb-toothed portion.

The comb-toothed portion of the rotary yoke 44 is divided by cuts in the central part in the axial direction, and one divided from the comb-tooth shaped portion of the rotary yoke 44 constitutes the A-phase side magnetic pole portions, and the other one constitutes the B-phase side magnetic pole portions. The A-phase side magnetic pole portions and the B-phase side magnetic pole portions are each comprised of 1 to n/2 comb-teeth (in the present embodiment, 12 comb-teeth) and arranged at regular intervals. The A-phase side magnetic pole portions of the rotary yoke 44 are arranged at intervals of 720/n° (in the present embodiment, 30°) in the circumferential direction, and each of them has a predetermined tooth width. The same applies to the A-phase side magnetic pole portions of the rotary yoke 44.

In the present embodiment, the male thread portion 443 is provided at the outer periphery of the rotary yoke 44, and the female thread portion 322a is provided in the sleeve portion 322 of the lens barrel 32. These component parts constitute a conversion mechanism that converts rotating movements of the rotary yoke 44 into forward and backward movements of the lens 31 along the optical axis.

Next, a description will be given of a stator and a rotor of a drive unit of the lens barrel drive apparatus according to the present embodiment.

The A-phase side magnet 35, the A-phase side coil 37, the A-phase side top yoke 40, the A-phase side bearing 42, the B-phase side magnet 36, the B-phase side coil 38, the B-phase side top yoke 41, and the B-phase side bearing 43 are fixed to the inner periphery of the stator yoke 39. These component parts constitute the stator of the drive unit of the lens barrel drive apparatus. Also, the rotary yoke 44 constitutes the rotor of the drive unit of the lens barrel drive apparatus.

The guide bar 33 and the detent bar 44 are fixed to a base plate, not shown. The base plate is fixed integrally to the stator. The rotary yoke 44 is rotatably supported with respect to the stator by the A-phase side bearing 42 and the B-phase side bearing 43, and the movement of the rotary yoke 44 along the optical axis with respect to the stator is limited by a mechanism such as a spring, not shown.

The engagement of the guide bar 33 with the sleeve portion 322 of the lens barrel 32 supports the lens barrel 32 such that the lens barrel 32 is movable straight with respect to the base plate. Also, the engagement of the rotation stopper bar 34 with the rotation stopper portion 323 limits the rotation of the lens barrel 32 with respect to the base plate, and thus, the lens barrel 32 can freely move only in a straight line. A female thread portion 322a provided inside the sleeve portion 322 of the lens barrel 32 and the male thread portion 443 provided at the outer periphery of the rotary yoke 44 act to move the lens barrel 32 along the optical axis with rotation of the rotary yoke 44. It should be noted that a cam groove may be formed in the rotor 44, and a drive pin may be provided in the sleeve portion 322 of the lens barrel 32 so as to convert rotating movements of the rotary yoke 44 into forward and backward movements of the lens barrel 32 along the optical axis.

As shown in FIG. 12, the guide bar 33 and the sleeve portion 322 of the lens barrel 32 are disposed in a space enclosed by the projected portion of the A-phase side coil 37, the break 35a of the A-phase side magnet 35, the break 36a of the B-phase side magnet 36, and the projected portion of the B-phase side coil 38. Thus, mechanical interference can be prevented.

Next, a description will be given of a drive principle for rotating the rotor with respect to the stator in the lens barrel drive apparatus according to the present embodiment.

A magnetic flux generated by energization of the A-phase side coil 37 forms a magnetic path around the A-phase side top yoke 40, the stator yoke 39, the A-phase side magnet 35, and the A-phase side magnetic pole portions 441 of the rotary yoke 44.

In the magnetic path, there are only two gaps: (1) a gap between the stator yoke 44 and the A-phase side top yoke 40, and (2) a gap between the A-phase side magnetic pole portions 441 and the A-phase side magnet 35. The magnetic flux formed by the A-phase side coil 37 effectively acts on the A-phase side first magnet 35. At this time, poles to be magnetized in the A-phase side magnetic pole portions 441 of the rotary yoke 44 can be selected according to the direction in which electric current is passed through the A-phase side coil 37.

Similarly, a magnetic flux generated by energization of the B-phase side coil 38 forms a magnetic path around the B-phase side top yoke 41, the stator yoke 39, the B-phase side magnet 36, and the B-phase side magnetic pole portions 442 of the rotary yoke 44. At this time, poles to be magnetized in the B-phase side magnetic pole portions 442 of the rotary yoke 44 can be selected according to the direction in which electric current is passed through the B-phase side coil 37.

FIGS. 14A to 17B are diagrams showing the relationship in angular position between the A-phase side magnetic pole portions 441 and the B-phase side magnetic pole portions 442 of the rotary yoke 44, the A-phase side magnet 35, and the B-phase side magnet 36. FIGS. 14A, 15A, 16A, and 17A are sectional views taken along an arrow A-A in FIG. 13, and FIGS. 14B, 15B, 16B, and 17B are sectional views taken along an arrow B-B in FIG. 13. Here, a phase difference between the A-phase side magnet 35 and the B-phase side magnet 36 is 180°/n (n is the number of poles of a virtual magnet; in the present embodiment, 7.5°).

Figure 14A:
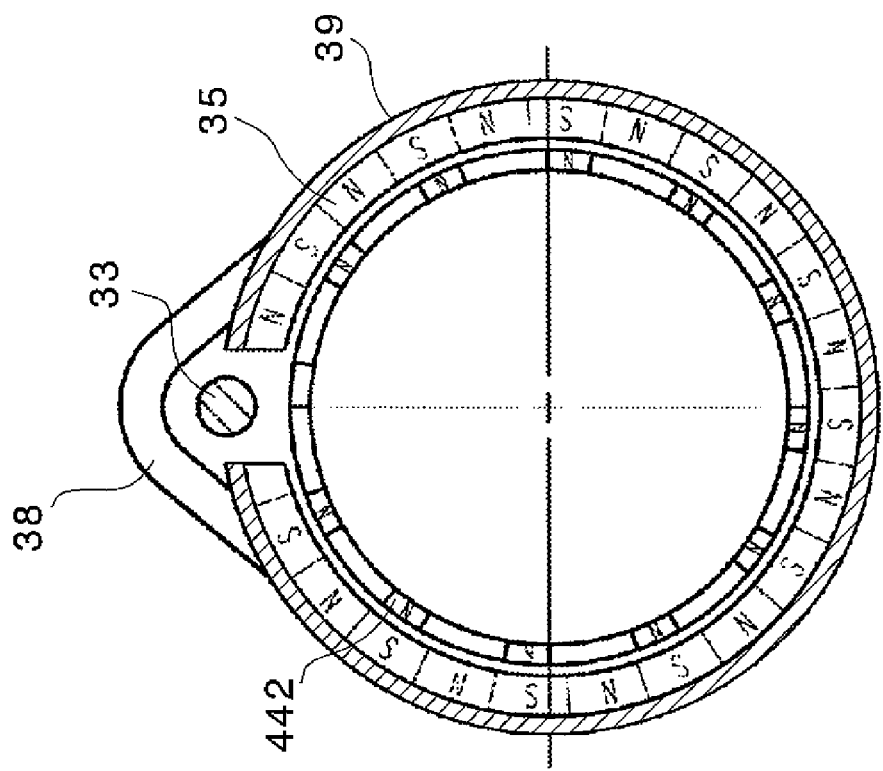
FIG. 14A is a sectional view taken along an arrow A-A in FIG. 13 in a state in which forward electric current is passed through an A-phase side coil, and forward electric current is passed through a B-phase side coil.
Figure 14B:
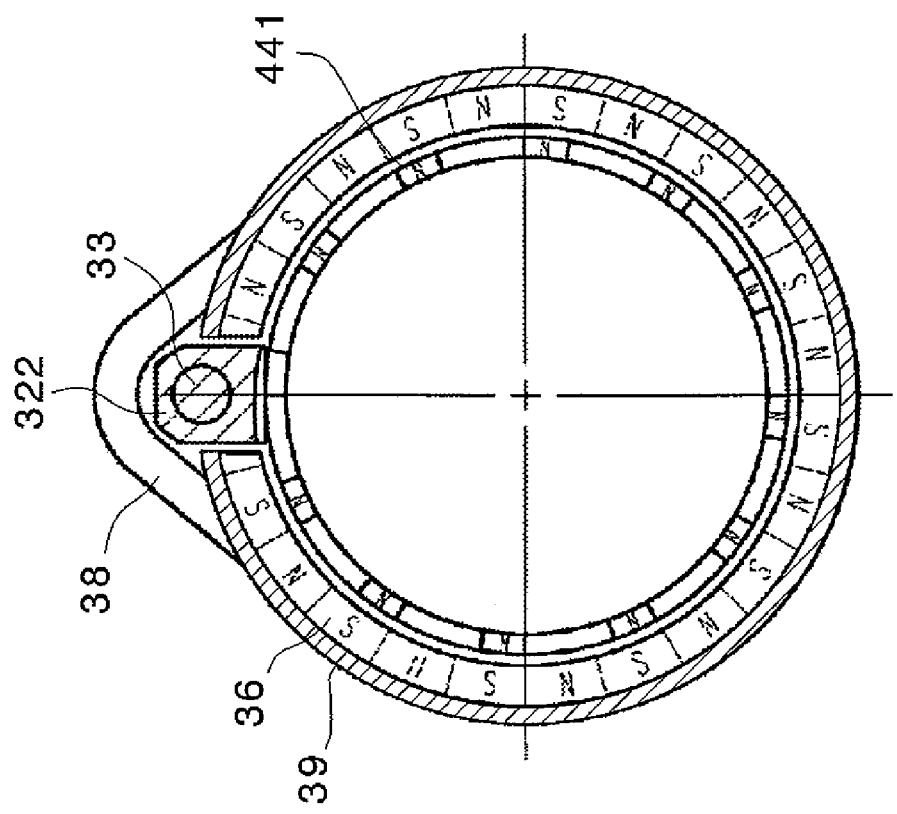
FIG. 14B is a sectional view taken along an arrow B-B in FIG. 13 in a state in which forward electric current is passed through the A-phase side coil, and forward electric current is passed through the B-phase side coil.

FIGS. 14A and 14B show a state in which forward electric current is passed through the A-phase side coil 37, and forward electric current is passed through the B-phase side coil 38. As a result of the energization, the A-phase side magnetic pole portions 441 are magnetized into north poles, and the B-phase side magnetic pole portions 442 are magnetized into north poles. At this time, the rotary yoke 44 stabilizes in an angular position shown in FIGS. 14A and 14B due to a magnetic balance between the magnetized A-phase side coil 37 and B-phase side coil 38, the A-phase side magnet 35, and the B-phase side magnet 36.

Figure 15A:
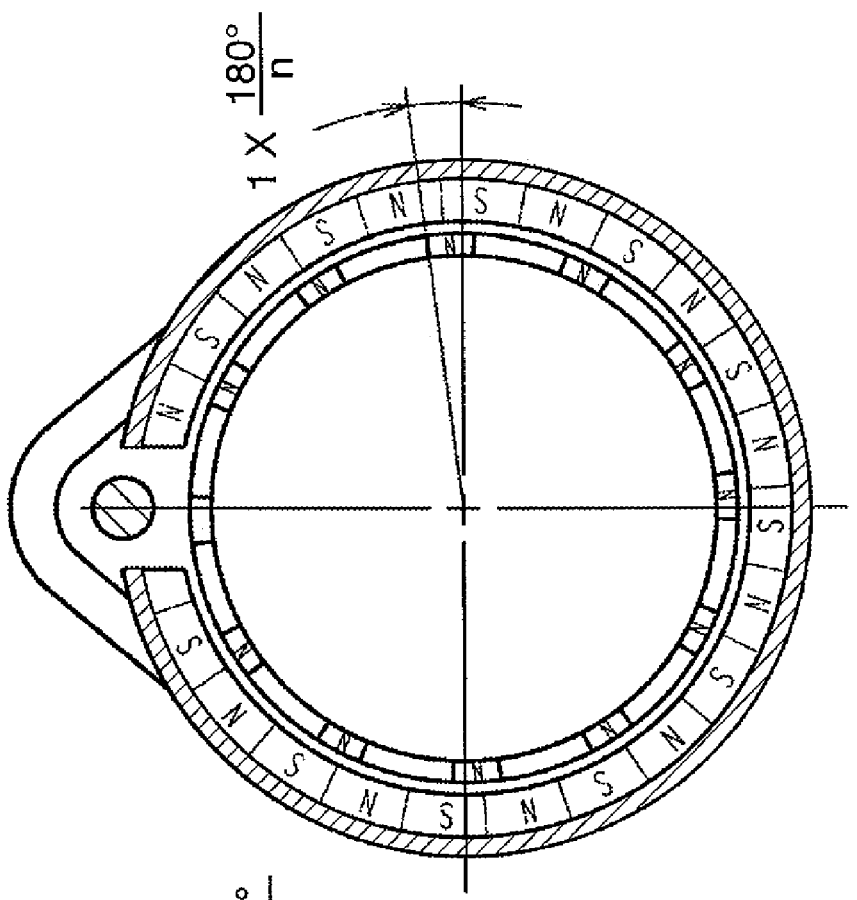
FIG. 15A is a sectional view taken along the arrow A-A in FIG. 13 in a state in which forward electric current is passed through the A-phase side coil, and backward electric current is passed through the B-phase side coil.
Figure 15B:
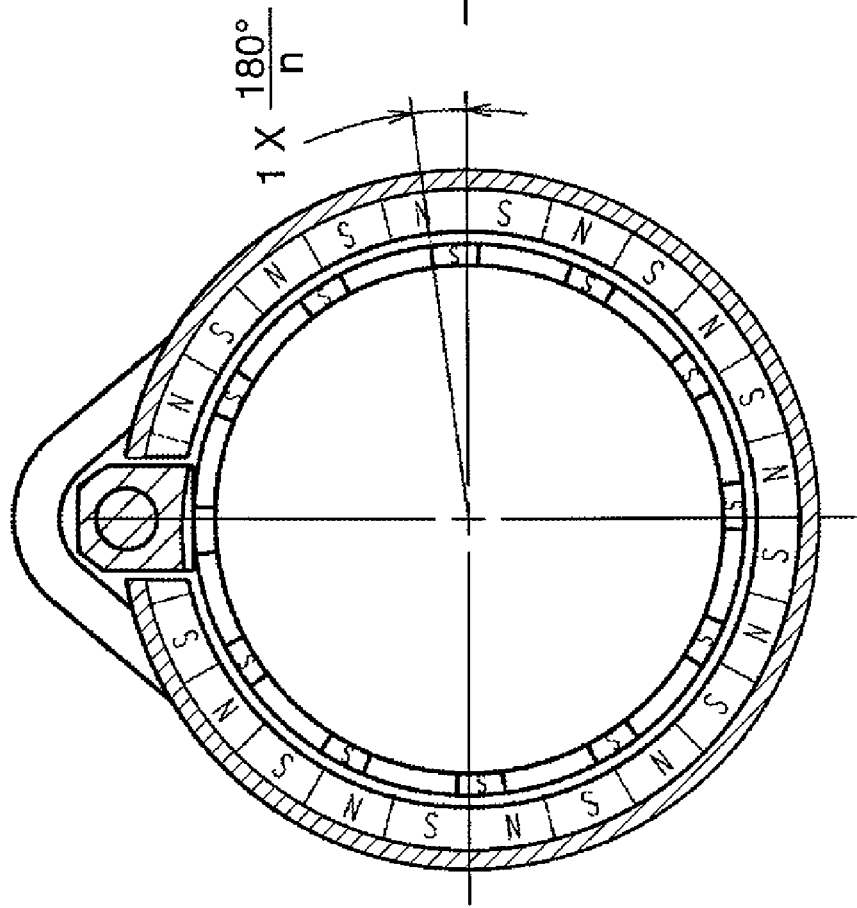
FIG. 15B is a sectional view taken along the arrow B-B in FIG. 13 in a state in which forward electric current is passed through the A-phase side coil, and backward electric current is passed through the B-phase side coil.

FIGS. 15A and 15B show a state in which forward electric current is passed through the A-phase side coil 37, and backward electric current is passed through the B-phase side coil 38. As a result of the energization, the A-phase side magnetic pole portions 441 are magnetized into north poles, and the B-phase side magnetic pole portions 442 are magnetized into south poles. The rotary yoke 44 is rotated through an angle of 1×180/n° (in the present embodiment, 7.5°) from the position shown in FIGS. 14A and 14B and stabilizes in an angular position shown in FIGS. 15A and 15B.

Figure 16A:
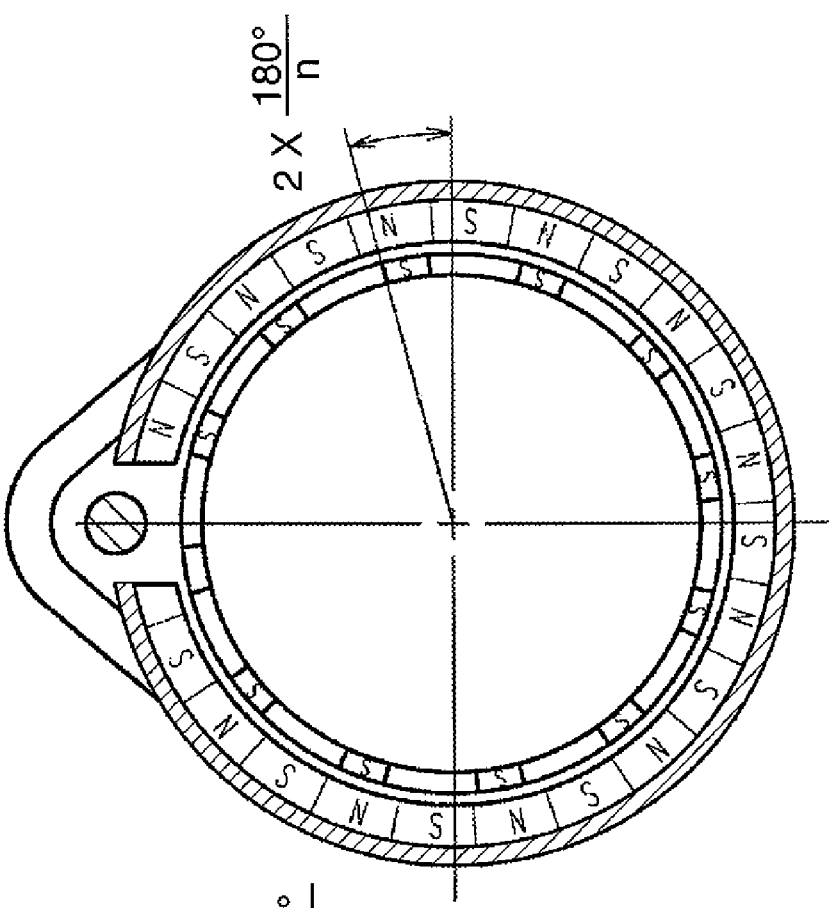
FIG. 16A is a sectional view taken along the arrow A-A in FIG. 13 in a state in which backward electric current is passed through the A-phase side coil, and backward electric current is passed through the B-phase side coil.
Figure 16B:
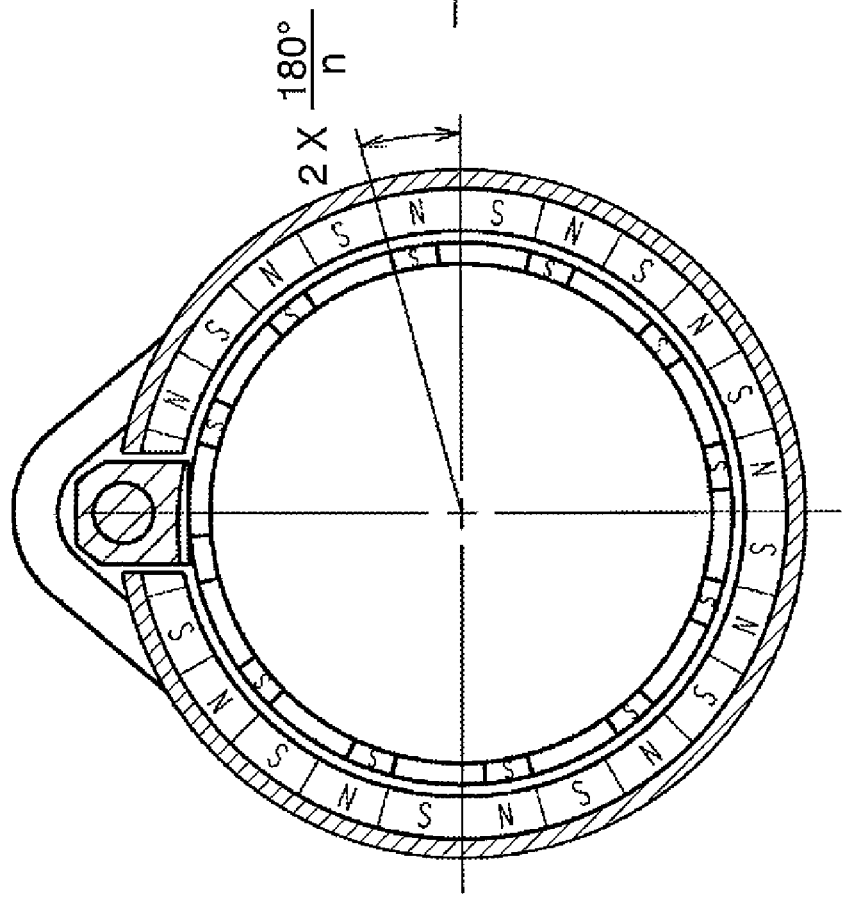
FIG. 16B is a sectional view taken along the arrow B-B in FIG. 13 in a state in which backward electric current is passed through the A-phase side coil, and backward electric current is passed through the B-phase side coil.

FIGS. 16A and 16B show a state in which backward electric current is passed through the A-phase side coil 37, and backward electric current is passed through the B-phase side coil 38. As a result of the energization, the A-phase side magnetic pole portions 441 are magnetized into south poles, and the B-phase side magnetic pole portions 442 are magnetized into south poles. The rotary yoke 44 is rotated through an angle of 2×180/n° (in the present embodiment, 15°) from the position shown in FIGS. 14A and 14B and stabilizes in an angular position shown in FIGS. 16A and 16B.

Figure 17A:
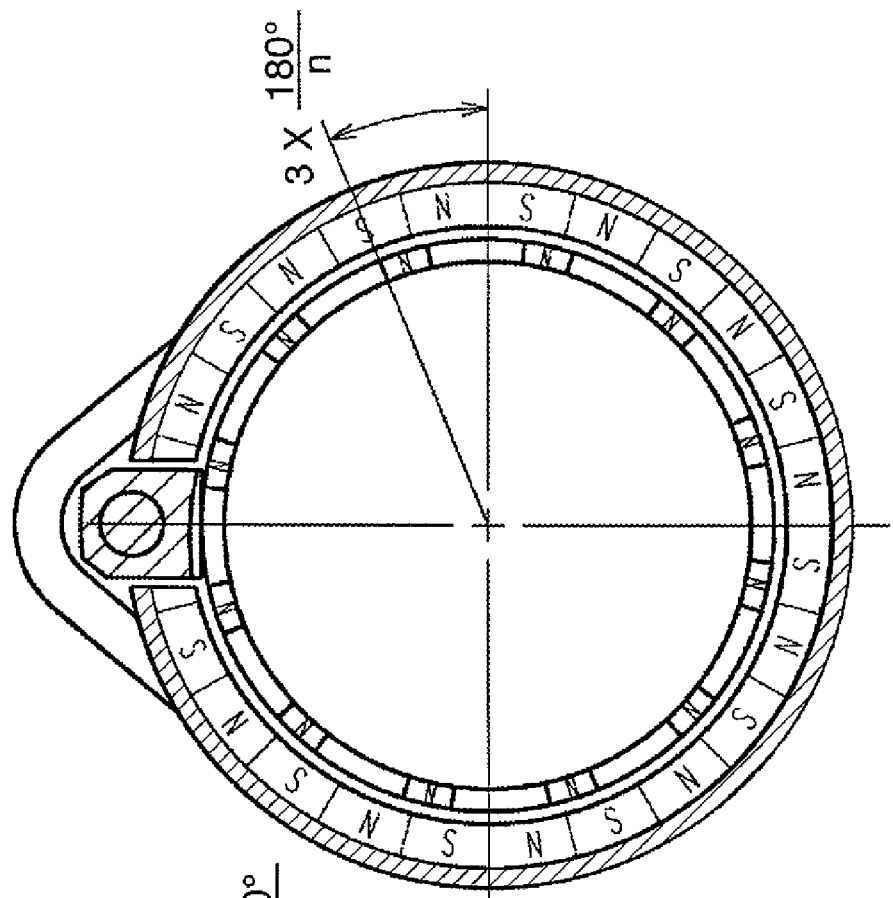
FIG. 17A is a sectional view taken along the arrow A-A in FIG. 13 in a state in which backward electric current is passed through the A-phase side coil, and forward electric current is passed through the B-phase side coil.
Figure 17B:
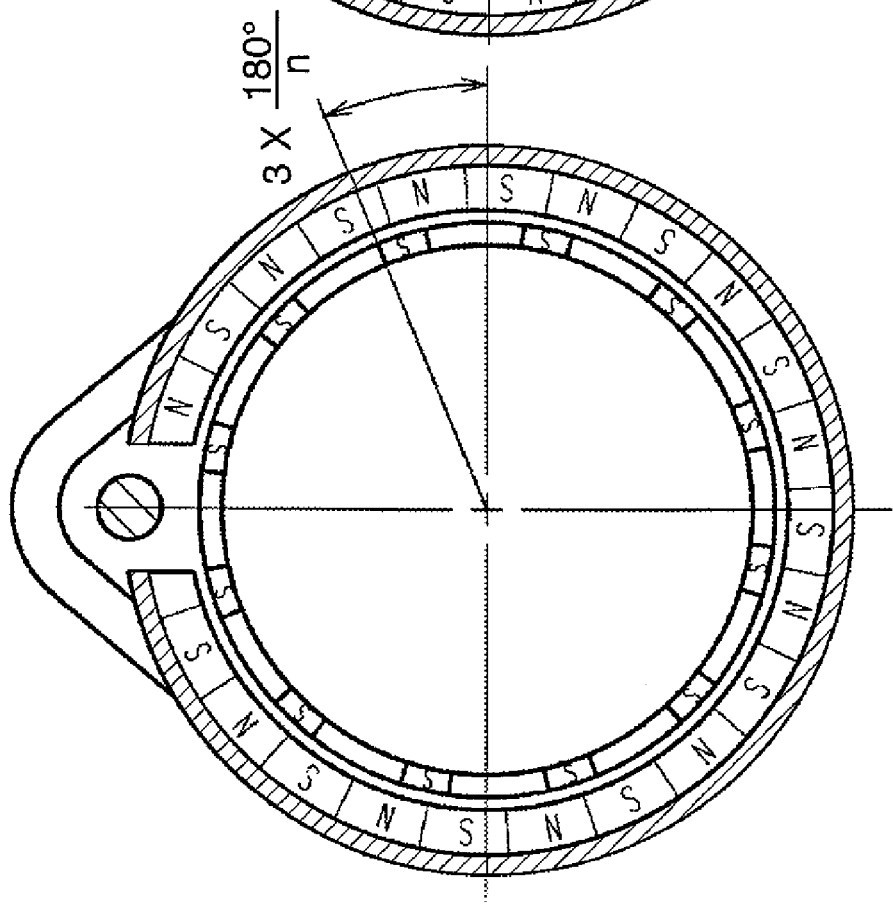
FIG. 17B is a sectional view taken along the arrow B-B in FIG. 13 in a state in which backward electric current is passed through the A-phase side coil, and forward electric current is passed through the B-phase side coil.

FIGS. 17A and 17B show a state in which backward electric current is passed through the A-phase side coil 37, and forward electric current is passed through the B-phase side coil 38. As a result of the energization, the A-phase side magnetic pole portions 441 are magnetized into south poles, and the B-phase side magnetic pole portions 442 are magnetized into north poles. The rotary yoke 44 is rotated through an angle of 3×180/n° (in the present embodiment, 25°) from the position shown in FIGS. 14A and 14B and stabilizes in an angular position shown in FIGS. 17A and 17B.

Next, forward electric current is passed through the A-phase side coil 37, and forward electric current is passed through the B-phase side coil 38 again. The rotary yoke 44 stabilizes in an angular position rotated through an angle of 4×180/n° (in the present embodiment, 30°) from the position shown in FIGS. 14A and 14B. This state is identical with the state illustrated in FIG. 14.

As described above, by sequentially changing the directions in which electric current is passed through the A-phase side coil 37 and the B-phase side coil 38, the position in which the rotary yoke 44 stabilizes in the rotating direction can be sequentially changed to rotate the rotary yoke 24 can be rotated. When the rotary yoke 44 rotates, the male thread portion 443 provided in the rotary yoke 44 and the female thread portion 322a formed in the sleeve portion 322 of the lens barrel 32 cause the lens barrel 32 to move forward and backward along the optical axis with the rotation of the rotary yoke 44.

As described above, according to the present embodiment, the rotary yoke 44 is disposed between the sleeve portion 322 of the lens barrel 32 and the lens 31. As a result, the lens barrel drive apparatus can be made small in diameter as in the above-described first embodiment.

Also, in the present embodiment, the A-phase side magnetic pole portions 441 and the B-phase side magnetic pole portions 442 of the rotary yoke 44 are configured as an integral unit. Thus, the rotor (rotary yoke 44) of the lens barrel drive apparatus can be made very thin. Further, the rotor is disposed immediately outside the lens 31, and the sleeve portion 322 of the lens barrel 32 is disposed immediately outside the rotor. As a result, the lens barrel drive apparatus can be made small in diameter.

Also, in the present embodiment, the A-phase side magnet 35, the B-phase side magnet 36, the A-phase side top yoke 40, the B-phase side top yoke 41, the A-phase side bearing 42, the B-phase side bearing 43, and the stator yoke 39 are each notched. Thus, without interfering with each other, they can be arranged in substantially the same diameter as the diameter of the sleeve portion 322 of the lens barrel 32 and the guide bar 33. Thus, only the projected portions of the A-phase side coil 37 and the B-phase side coil 38 are arranged outside the sleeve portion 322 of the lens barrel 32, and hence, the lens barrel drive apparatus can be made small in diameter.

Also, it the present embodiment, the rotor (rotary yoke 44) is disposed on the inner peripheral side, and the stator is disposed on the outer peripheral side. The diameters of the bearings can be reduced as compared with the case where the rotor is disposed on the outer peripheral side, and hence friction loss during rotation can be reduced. Also, if one which is disposed on the outer peripheral side is unmovable (stator), handling is easier, and this is advantageous when the lens barrel drive apparatus is incorporated into another apparatus.

In the above-described embodiments, it may be arranged such that, in the axial direction of the same magnet, there are a part on which the magnetic path formed by the A-phase side coil 17 acts, and a part on which the magnetic path formed by the B-phase side coil 18 acts. This arrangement should not be limited to any particular arrangement. The arrangements in the first and second embodiments are examples of the above arrangement. Specifically, in the first and second embodiments, in the axial direction of the first magnet 15, there are a part on which the magnetic path formed by the A-phase side coil 17 acts, and a part on which the magnetic path formed by the B-phase side coil 18 acts. Similarly, in the axial direction of the second magnet 16, there are a part on which the magnetic path formed by the A-phase side coil 17 acts, and a part on which the magnetic path formed by the B-phase side coil 18 acts.

Also, it may be arranged such that, in different magnets, there are a part on which the magnetic path formed by the A-phase side coil acts, and a part on which the magnetic path formed by the B-phase side coil acts. This arrangement should not be limited to any particular arrangement. The arrangement in the third embodiment (the A-phase side magnet 35 and the B-phase side magnet 36) is an example of the above arrangement. In this case, as in the third embodiment, the phase difference between the A-phase side magnetic pole portions and the B-phase side magnetic pole portions can be zero, and the A-phase side magnetic pole portions and the B-phase side magnetic pole portions can be formed of the same component part with ease.

Also, the number of breaks provided between the two magnets may be two as in the first and second embodiments, or one. Also, the breaks may be penetrated through the magnet along the optical axis as in the first and second embodiments, or may not be penetrated through the magnet along the optical axis as shown in FIG. 18.

Figure 18:
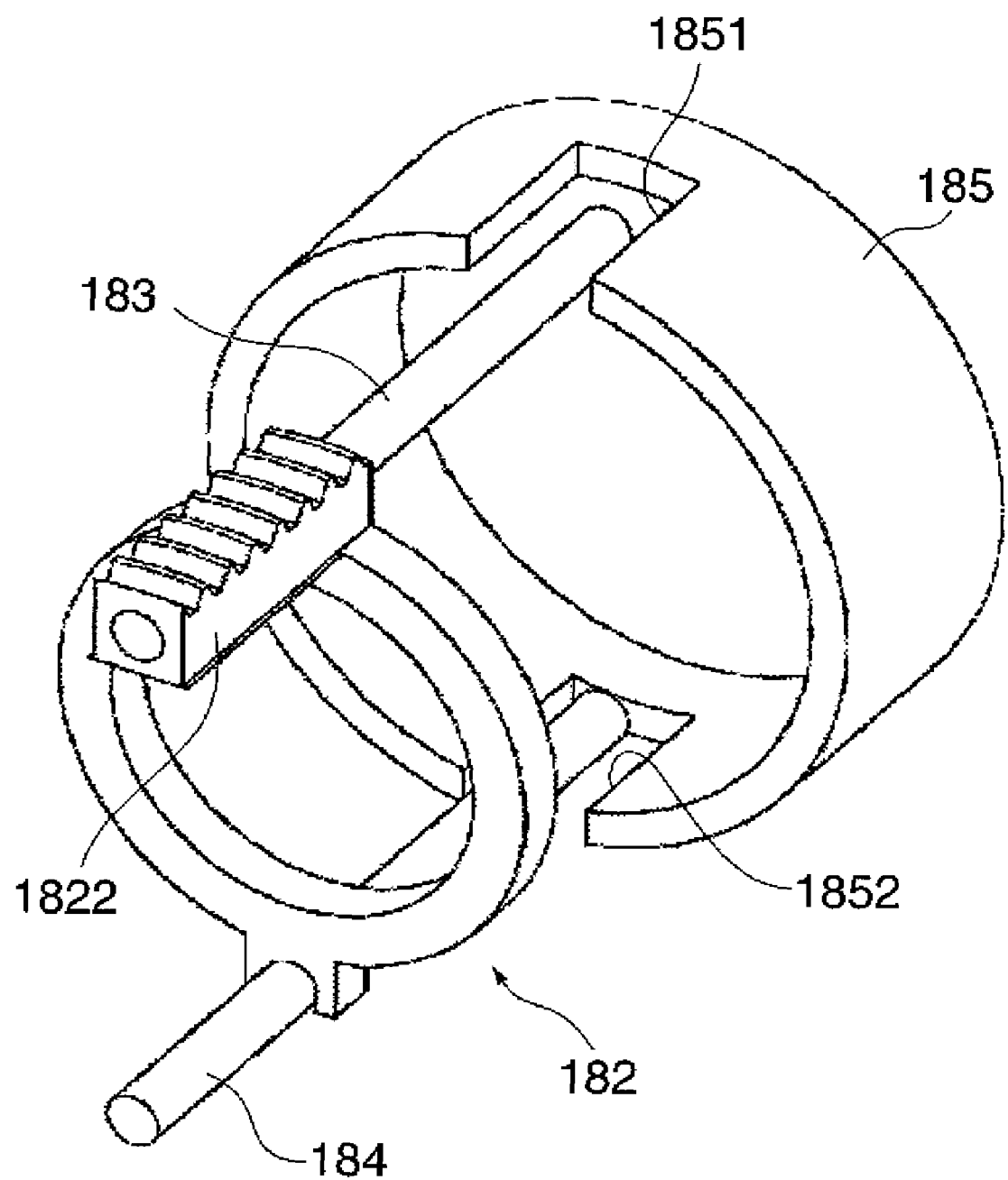
FIG. 18 is a partial perspective view showing a variation of a lens barrel appearing in FIG. 11.
Figure 19A:
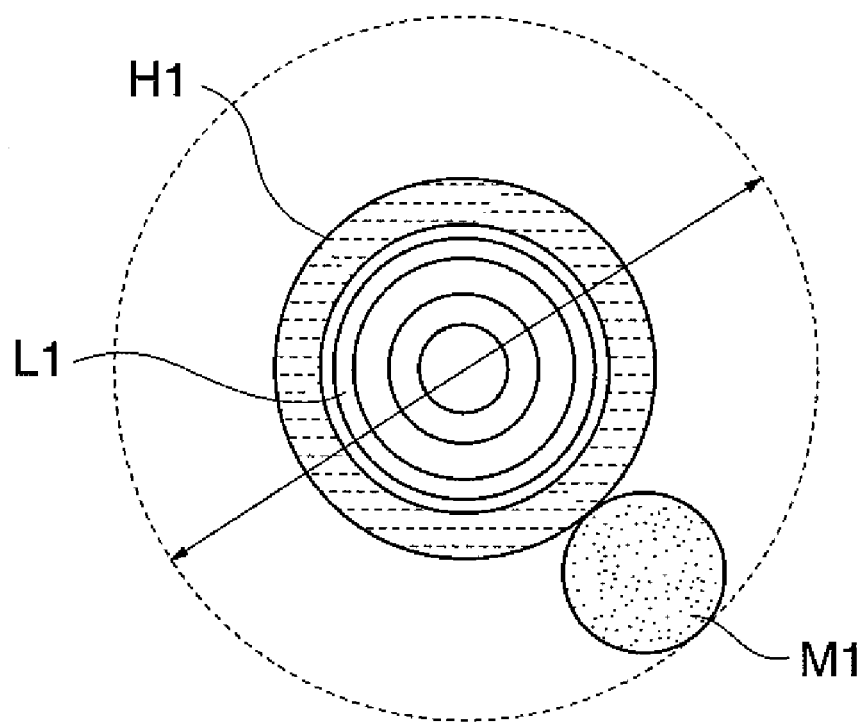
FIG. 19A is a front view showing a conventional lens barrel drive apparatus as viewed in the direction of an optical axis in a case where a solid motor is used.
Figure 19B:
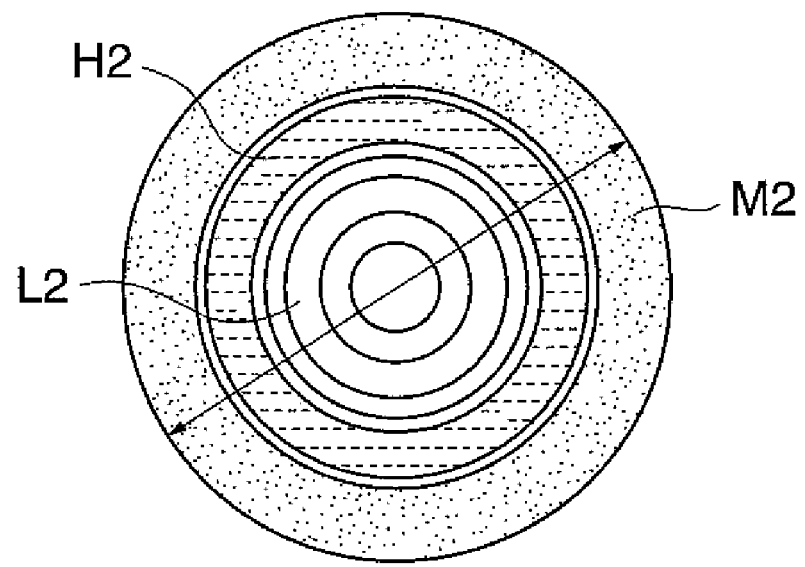
FIG. 19B is a front view showing a conventional lens barrel drive apparatus as viewed in the direction of an optical axis in a case where a hollow motor is used.

FIG. 18 is a partial perspective view showing a variation of the magnet 35 appearing in FIG. 11. As shown in FIG. 18, a magnet 185 is comprised of notches 1851 and 1852 formed along the optical axis. An end of a guide bar 183 fitted in a sleeve portion 1822 of a lens barrel 182 and an end of a rotation stopper bar 184 fitted in a rotation stopper portion of the lens barrel 182 are arranged in the notches 1851 and 1852, respectively. Since the notches 1851 and 1852 are not penetrated through the magnet 185 along the optical axis, the magnet 185 is not divided, and hence the magnet 185 can be formed of one component part. Thus, there is no need to adjust the phase difference between a plurality of magnets, and assembling becomes easier.

Also, in the present variation, a coil may be wound in such a manner as to pass outside the lens 11 and inside the guide bar 13 and the detent bar 14 as is the case with the first embodiment so as to prevent interference between the coil and the guide bar 13. Alternatively, a coil may be wound outside the lens 31 and the guide bar 33 as in the third embodiment.

Also, although in the above description of the first to third embodiments, the type of image pickup apparatus on which the lens barrel drive apparatus is mounted is not specified, the lens barrel drive apparatus may be applied to various image pickup apparatuses such as a still camera and a video camera.

Also, although in the second embodiment, the cam groove is provided at the inner periphery of the base plate, and the drive pin is provided at the outer periphery of the rotor, this is not limitative. A female thread portion may be provided at the inner periphery of the base plate, and a male thread portion may be provided at the outer periphery of the rotor.

Also, the lens barrel drive apparatus may be constructed such that the lens is not held by the lens barrel but is held by the stator yoke (i.e. no lens barrel is provided) as in the above-described second embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-123660 filed Apr. 27, 2006, which is hereby incorporated by reference herein in its entirety.

What is claimed is:

1. A lens barrel drive apparatus comprising:
a guide member adapted to guide an optical component along an optical axis;
hollow magnets disposed on an outer peripheral side of the optical component and having magnetized portions alternately magnetized to different poles in a circumferential direction;
a cylindrical rotor disposed rotatably with respect to said magnets and formed of a soft magnetic material, said cylindrical rotor comprising magnetic pole portions opposed to the magnetized portions of said magnets;
a coil adapted to magnetize the magnetic pole portions of said rotor;
a stator adapted to fix said magnets and said coil; and
a conversion unit adapted to convert rotating movements of said rotor into forward and backward movements of the optical component along the optical axis,
wherein said magnets comprise breaks formed along the optical axis, and said guide member is disposed in the break of said magnets,
said rotor comprises a rotary yoke having the magnetic pole portions, and a rotor having an inner periphery to which said rotary yoke is fixed, and
said conversion unit comprises a female thread portion formed at the inner periphery of said rotor, and a male thread portion formed in said guide member and adapted to be engaged with said female thread portion.

2. A lens barrel drive apparatus comprising:
a guide member adapted to guide an optical component along an optical axis;
hollow magnets disposed on an outer peripheral side of the optical component and having magnetized portions alternately magnetized to different poles in a circumferential direction;
a cylindrical rotor disposed rotatably with respect to said magnets and formed of a soft magnetic material, said cylindrical rotor comprising magnetic pole portions opposed to the magnetized portions of said magnets;
a coil adapted to magnetize the magnetic pole portions of said rotor;
a stator adapted to fix said magnets and said coil: and
a conversion unit adapted to convert rotating movements of said rotor into forward and backward movements of the optical component along the optical axis,
wherein said magnets comprise breaks formed along the optical axis, and said guide member is disposed in the break of said magnets,
said rotor comprises a rotary yoke having the magnetic pole portions, and a rotor having an inner periphery to which said rotary yoke is fixed, and
said conversion unit comprises a female thread portion formed at the inner periphery of a cylindrical member disposed on an outer peripheral side of said rotor, and a male thread portion formed at an outer periphery of said rotor and adapted to be engaged with said female thread portion.

3. A lens barrel drive apparatus comprising:
a guide member adapted to guide an optical component along an optical axis;
hollow magnets disposed on an outer peripheral side of the optical component and having magnetized portions alternately magnetized to different poles in a circumferential direction;
a cylindrical rotor disposed rotatably with respect to said magnets and formed of a soft magnetic material, said cylindrical rotor comprising magnetic pole portions opposed to the magnetized portions of said magnets;
a coil adapted to magnetize the magnetic pole portions of said rotor;
a stator adapted to fix said magnets and said coil: and
a conversion unit adapted to convert rotating movements of said rotor into forward and backward movements of the optical component along the optical axis,
wherein said magnets comprise breaks formed along the optical axis, and said guide member is disposed in the break of said magnets,
said rotor comprises a rotary yoke having the magnetic pole portions, and
said conversion unit comprises a male thread portion formed at an outer periphery of said rotary yoke, and a female thread portion formed in said guide member and adapted to be engaged with said male thread portion.

* * * * *